United States Patent
Busa et al.

(10) Patent No.: US 11,889,830 B2
(45) Date of Patent: Feb. 6, 2024

(54) SYSTEM AND PROCESS FOR CONTINUOUS ADDITION OF CRYOPROTECTANT

(71) Applicant: ABS Global, Inc., DeForest, WI (US)

(72) Inventors: Domenic Busa, DeForest, WI (US); Michael Botts, DeForest, WI (US); Gary Klas, DeForest, WI (US); Johnathan Parker, DeForest, WI (US)

(73) Assignee: ABS GLOBAL, INC., DeForest, WI (US)

( * ) Notice: Subject to any disclaimer, the term of this patent is extended or adjusted under 35 U.S.C. 154(b) by 0 days.

(21) Appl. No.: 16/852,303

(22) Filed: Apr. 17, 2020

(65) Prior Publication Data
US 2020/0329696 A1  Oct. 22, 2020

Related U.S. Application Data

(60) Provisional application No. 62/835,676, filed on Apr. 18, 2019.

(51) Int. Cl.
*A01N 1/02* (2006.01)

(52) U.S. Cl.
CPC .......... *A01N 1/0221* (2013.01); *A01N 1/0242* (2013.01); *A01N 1/0268* (2013.01)

(58) Field of Classification Search
CPC ... A01N 1/0221; A01N 1/0242; A01N 1/0268
USPC ..................................................... 435/284.1
See application file for complete search history.

(56) References Cited

U.S. PATENT DOCUMENTS

| | | |
|---|---|---|
| 3,390,449 A | 7/1968 | Fox |
| 3,649,829 A | 3/1972 | Randolph |
| 3,661,460 A | 5/1972 | Elking et al. |
| 3,710,933 A | 1/1973 | Fulwyler et al. |

(Continued)

FOREIGN PATENT DOCUMENTS

| | | |
|---|---|---|
| CA | 1341328 C | 12/2001 |
| CN | 2125369 U | 12/1992 |

(Continued)

OTHER PUBLICATIONS

USPTO, "Final Office Action," issued in connection with U.S. Appl. No. 16/741,608, dated Oct. 21, 2021, 11 pages.

(Continued)

*Primary Examiner* — Michael L Hobbs
*Assistant Examiner* — Lenora A Abel
(74) *Attorney, Agent, or Firm* — NGUYEN TARBET LLC

(57) ABSTRACT

An integrated system and method for preparing sperm cells to improve their survivability during cryopreservation are described herein. The system features a vessel, a controlled dispenser, and a dispense tube. The dispense tube has a first end fluidly connected to the dispenser and a second end disposed inside the vessel. The second end can be submerged in the sperm cell fluid. The controlled dispenser may be a syringe pump that includes a syringe for containing a cryoprotectant and a pushing mechanism for displacing the syringe. The syringe pump is configured to discharge the cryoprotectant through the dispense tube and into the vessel, thereby dispensing the cryoprotectant into the sperm cell fluid. Mixing of the fluids is achieved using a shaker table agitation.

17 Claims, 10 Drawing Sheets
(1 of 10 Drawing Sheet(s) Filed in Color)

(56) References Cited

U.S. PATENT DOCUMENTS

| | | |
|---|---|---|
| 3,764,901 A | 10/1973 | Kachel |
| 3,791,517 A | 2/1974 | Friedman |
| 3,863,962 A | 2/1975 | Thomas et al. |
| 4,175,662 A | 11/1979 | Zold |
| 4,325,706 A | 4/1982 | Gershman et al. |
| 4,395,397 A | 7/1983 | Shapiro |
| 4,409,106 A | 10/1983 | Furuta et al. |
| 4,424,132 A | 1/1984 | Iriguchi |
| 4,660,971 A | 4/1987 | Sage et al. |
| 4,667,830 A | 5/1987 | Nozaki, Jr. et al. |
| 4,765,737 A | 8/1988 | Harris et al. |
| 4,885,473 A | 12/1989 | Shofner et al. |
| 4,919,817 A | 4/1990 | Schoendorfer et al. |
| 4,983,038 A | 1/1991 | Ohki et al. |
| 5,007,732 A | 4/1991 | Ohki et al. |
| 5,030,002 A | 7/1991 | North, Jr. |
| 5,100,627 A | 3/1992 | Buican et al. |
| 5,125,749 A | 6/1992 | Eugers et al. |
| 5,135,759 A | 8/1992 | Johnson |
| 5,180,065 A | 1/1993 | Touge et al. |
| 5,194,909 A | 3/1993 | Tycko |
| 5,229,297 A | 7/1993 | Schnipelsky et al. |
| 5,483,469 A | 1/1996 | Van den engh et al. |
| 5,491,550 A | 2/1996 | Dabbs |
| 5,620,857 A | 4/1997 | Weetall et al. |
| 5,674,743 A | 10/1997 | Ulmer |
| 5,689,109 A | 11/1997 | Schultze |
| 5,752,606 A | 5/1998 | Wilson et al. |
| 5,800,690 A | 9/1998 | Chow et al. |
| 5,837,115 A | 11/1998 | Austin et al. |
| 5,849,178 A | 12/1998 | Holm et al. |
| 5,858,187 A | 1/1999 | Ramsey et al. |
| 5,879,625 A | 3/1999 | Rosianiec et al. |
| 5,966,457 A | 10/1999 | Lemelson |
| 5,985,216 A | 11/1999 | Rens et al. |
| 6,008,010 A | 12/1999 | Greenberger et al. |
| 6,053,856 A | 4/2000 | Hlavinka |
| 6,071,442 A | 6/2000 | Dean et al. |
| 6,146,897 A | 11/2000 | Cohenford et al. |
| 6,159,739 A | 12/2000 | Weigl et al. |
| 6,159,749 A | 12/2000 | Yagang et al. |
| 6,171,865 B1 | 1/2001 | Weigl et al. |
| 6,185,664 B1 | 2/2001 | Jeddeloh |
| 6,213,151 B1 | 4/2001 | Jacobson et al. |
| H1960 H | 6/2001 | Conrad et al. |
| 6,368,871 B1 | 4/2002 | Christel et al. |
| 6,416,190 B1 | 7/2002 | Grier et al. |
| 6,416,959 B1 | 7/2002 | Giuliano et al. |
| 6,432,630 B1 | 8/2002 | Blankenstein |
| 6,451,264 B1 | 9/2002 | Bhullar et al. |
| 6,494,230 B2 | 12/2002 | Chow |
| 6,506,609 B1 | 1/2003 | Wada |
| 6,519,032 B1 | 2/2003 | Kuebler et al. |
| 6,519,954 B1 | 2/2003 | Prien et al. |
| 6,524,860 B1 | 2/2003 | Seidel et al. |
| 6,540,895 B1 | 4/2003 | Spence et al. |
| 6,549,275 B1 | 4/2003 | Cabuz et al. |
| 6,592,821 B1 | 7/2003 | Wada et al. |
| 6,637,463 B1 | 10/2003 | Lei et al. |
| 6,674,525 B2 | 1/2004 | Bardell et al. |
| 6,727,451 B1 | 4/2004 | Fuhr et al. |
| 6,808,075 B2 | 10/2004 | Bohm et al. |
| 6,833,542 B2 | 12/2004 | Wang et al. |
| 6,838,056 B2 | 1/2005 | Foster |
| 6,841,388 B2 | 1/2005 | Dukor et al. |
| 6,853,654 B2 | 2/2005 | Mcdonald et al. |
| 6,877,528 B2 | 4/2005 | Gilbert et al. |
| 6,944,324 B2 | 9/2005 | Tran et al. |
| 6,976,590 B2 | 12/2005 | Deshpande et al. |
| 7,029,430 B2 | 4/2006 | Hlavinka et al. |
| 7,069,943 B2 | 7/2006 | Gilbert et al. |
| 7,092,154 B2 | 8/2006 | Yasuda et al. |
| 7,104,405 B2 | 9/2006 | Böhm et al. |
| 7,208,265 B1 | 4/2007 | Schenk |
| 7,195,920 B2 | 5/2007 | Seidel et al. |
| 7,241,988 B2 | 7/2007 | Gruber et al. |
| 7,276,701 B2 | 10/2007 | Lendl |
| 7,298,478 B2 | 11/2007 | Gilbert et al. |
| 7,300,803 B2 | 11/2007 | Lin et al. |
| 7,311,476 B2 | 12/2007 | Gilbert et al. |
| 7,312,085 B2 | 12/2007 | Chou et al. |
| 7,355,696 B2 | 4/2008 | Mueth et al. |
| 7,355,699 B2 | 4/2008 | Gilbert et al. |
| 7,466,734 B1 | 12/2008 | Day et al. |
| 7,472,794 B2 | 1/2009 | Oakey et al. |
| 7,482,577 B2 | 1/2009 | Gruber et al. |
| 7,492,522 B2 | 2/2009 | Gilbert et al. |
| 7,524,681 B2 | 4/2009 | Wolf et al. |
| 7,569,788 B2 | 8/2009 | Deshpande et al. |
| 7,576,861 B2 | 8/2009 | Gilbert et al. |
| 7,584,857 B2 | 9/2009 | Böhm et al. |
| 7,611,309 B2 | 11/2009 | Gilbert et al. |
| 7,670,471 B2 | 3/2010 | Quake et al. |
| 7,697,576 B2 | 4/2010 | Maier et al. |
| 7,760,351 B2 | 7/2010 | Cox et al. |
| 7,820,425 B2 | 10/2010 | Schenk |
| 7,826,509 B2 | 11/2010 | Belkin et al. |
| 7,956,328 B2 | 6/2011 | Sundaram et al. |
| 7,963,399 B2 | 6/2011 | Böhm et al. |
| 7,997,831 B2 | 8/2011 | Gilbert et al. |
| 8,032,200 B2 | 10/2011 | Tearney et al. |
| 8,080,422 B2 | 12/2011 | Neas et al. |
| 8,123,044 B2 | 2/2012 | Johnson et al. |
| 8,149,402 B2 | 4/2012 | Rich |
| 8,158,122 B2 | 4/2012 | Hampson et al. |
| 8,173,001 B2 | 5/2012 | Quake et al. |
| 8,174,394 B2 | 5/2012 | Ridder et al. |
| 8,198,092 B2 | 6/2012 | Durack et al. |
| 8,206,987 B2 | 6/2012 | Durack et al. |
| 8,209,987 B2 | 7/2012 | Hautman et al. |
| 8,210,209 B2 | 7/2012 | Gilbert et al. |
| 8,277,764 B2 | 10/2012 | Gilbert et al. |
| 8,388,822 B2 | 3/2013 | Quake et al. |
| 8,408,399 B2 | 4/2013 | Böhm et al. |
| 8,502,148 B2 | 8/2013 | Wagner et al. |
| 8,529,161 B2 | 9/2013 | Gilbert et al. |
| 8,563,325 B1 | 10/2013 | Bartsch et al. |
| 8,567,608 B2 | 10/2013 | Deshpande et al. |
| 8,569,069 B2 | 10/2013 | Durack |
| 8,623,295 B2 | 1/2014 | Gilbert et al. |
| 8,727,131 B2 | 5/2014 | Deshpande et al. |
| 8,731,860 B2 | 5/2014 | Charles et al. |
| 8,941,062 B2 | 1/2015 | Wagner et al. |
| 8,961,904 B2 | 2/2015 | Xia et al. |
| 8,964,184 B2 | 2/2015 | Gilbert et al. |
| 8,981,298 B2 | 3/2015 | Wagner et al. |
| 9,000,357 B2 | 4/2015 | Mueth et al. |
| 9,003,869 B2 | 4/2015 | Wagner et al. |
| 9,011,797 B2 | 4/2015 | Gilbert et al. |
| 9,109,195 B2 | 8/2015 | Zimmermann et al. |
| 9,140,690 B2 | 9/2015 | Mueth et al. |
| 9,255,874 B2 | 2/2016 | Sharpe et al. |
| 9,260,693 B2 | 2/2016 | Johnson et al. |
| 9,335,247 B2 | 5/2016 | Sharpe et al. |
| 9,335,295 B2 | 5/2016 | Mueth et al. |
| 9,339,850 B2 | 5/2016 | Deshpande et al. |
| 9,365,822 B2 | 6/2016 | Seidel et al. |
| 9,377,400 B2 | 6/2016 | Wagner et al. |
| 9,446,912 B2 | 9/2016 | Gilbert et al. |
| 9,485,984 B2 * | 11/2016 | Burbank .............. A01N 1/0252 |
| 9,550,215 B2 | 1/2017 | Deshpande et al. |
| 9,588,100 B2 | 3/2017 | Appleyard et al. |
| 9,618,442 B2 | 4/2017 | Sharpe et al. |
| 9,683,922 B2 | 6/2017 | Wagner et al. |
| D791,338 S | 7/2017 | Morkos et al. |
| 9,752,976 B2 | 9/2017 | Gilbert et al. |
| 9,781,918 B2 * | 10/2017 | Zimmermann ........ C12M 45/22 |
| 9,802,767 B2 | 10/2017 | Gilbert et al. |
| 9,823,252 B2 | 11/2017 | Gilbert et al. |
| 9,835,552 B2 | 12/2017 | Wagner |
| D815,754 S | 4/2018 | Morkos et al. |
| 9,943,847 B2 | 4/2018 | Gilbert et al. |
| 9,964,968 B2 | 5/2018 | Sharpe et al. |
| 10,025,322 B2 | 7/2018 | Ofstrom et al. |

(56) References Cited

U.S. PATENT DOCUMENTS

| | | |
|---|---|---|
| 10,029,283 B2 | 7/2018 | Deshpande et al. |
| 10,175,159 B2 | 1/2019 | Wagner et al. |
| 10,180,388 B2 | 1/2019 | Wagner |
| 10,216,144 B2 | 2/2019 | Mueth et al. |
| 10,315,194 B2 | 6/2019 | Akiyama et al. |
| 11,187,224 B2 | 11/2021 | Xia et al. |
| 11,193,879 B2 | 12/2021 | Wagner et al. |
| 11,243,494 B2 | 2/2022 | Mueth et al. |
| 2002/0027649 A1 | 3/2002 | Chudner |
| 2002/0042042 A1 | 4/2002 | Fahy |
| 2002/0058332 A1 | 5/2002 | Quake et al. |
| 2002/0106716 A1 | 8/2002 | Leboeuf et al. |
| 2002/0115208 A1 | 8/2002 | Mitchell et al. |
| 2002/0176069 A1 | 11/2002 | Hansen et al. |
| 2002/0198928 A1 | 12/2002 | Bukshpan et al. |
| 2003/0007894 A1 | 1/2003 | Wang et al. |
| 2003/0032204 A1 | 2/2003 | Walt et al. |
| 2003/0047676 A1 | 3/2003 | Grier et al. |
| 2003/0054365 A1 | 3/2003 | Xu et al. |
| 2003/0054558 A1 | 3/2003 | Kurabayashi et al. |
| 2003/0068646 A1 | 4/2003 | Singh et al. |
| 2003/0113709 A1 | 6/2003 | Alivisatos et al. |
| 2003/0175944 A1 | 9/2003 | Yang et al. |
| 2003/0175980 A1 | 9/2003 | Hayenga et al. |
| 2003/0186426 A1 | 10/2003 | Brewer et al. |
| 2004/0043506 A1 | 3/2004 | Haussecker et al. |
| 2004/0079893 A1 | 4/2004 | Dietz et al. |
| 2004/0089798 A1 | 5/2004 | Gruber et al. |
| 2004/0144648 A1 | 7/2004 | Jacobson et al. |
| 2004/0161772 A1 | 8/2004 | Bohm et al. |
| 2004/0166504 A1 | 8/2004 | Rossier et al. |
| 2004/0206399 A1 | 10/2004 | Heller et al. |
| 2004/0217297 A1 | 11/2004 | Moses et al. |
| 2004/0229349 A1 | 11/2004 | Daridon |
| 2004/0266022 A1 | 12/2004 | Sundararajan et al. |
| 2005/0037471 A1 | 2/2005 | Liu et al. |
| 2005/0061962 A1 | 3/2005 | Mueth et al. |
| 2005/0103690 A1 | 5/2005 | Kawano et al. |
| 2005/0112541 A1 | 5/2005 | Durack et al. |
| 2005/0121604 A1 | 6/2005 | Mueth et al. |
| 2005/0123450 A1 | 6/2005 | Gilbert |
| 2005/0124869 A1 | 6/2005 | Hefti et al. |
| 2005/0148085 A1 | 7/2005 | Larsen |
| 2005/0153354 A1 | 7/2005 | Gilmanshin |
| 2005/0190372 A1 | 9/2005 | Dogariu |
| 2005/0196876 A1 | 9/2005 | Chan et al. |
| 2005/0207940 A1 | 9/2005 | Butler et al. |
| 2005/0207943 A1 | 9/2005 | Puzey |
| 2006/0013270 A1 | 1/2006 | Yumoto et al. |
| 2006/0035273 A1 | 2/2006 | Quake et al. |
| 2006/0043301 A1 | 3/2006 | Mantele et al. |
| 2006/0058167 A1 | 3/2006 | Regusa et al. |
| 2006/0078888 A1 | 4/2006 | Griffiths |
| 2006/0105453 A1 | 5/2006 | Brenan et al. |
| 2006/0152707 A1 | 7/2006 | Kanda |
| 2006/0170912 A1 | 8/2006 | Mueth et al. |
| 2006/0252047 A1 | 11/2006 | Ekstrom et al. |
| 2006/0257089 A1 | 11/2006 | Mueth et al. |
| 2006/0263829 A1 | 11/2006 | Evans et al. |
| 2007/0009386 A1 | 1/2007 | Padmanabhan et al. |
| 2007/0078348 A1 | 4/2007 | Holman |
| 2007/0114172 A1 | 5/2007 | Mueth et al. |
| 2007/0128082 A1 | 6/2007 | Yang et al. |
| 2007/0207551 A1 | 9/2007 | Glensbjerg |
| 2007/0247620 A1 | 10/2007 | Koo |
| 2007/0248958 A1 | 10/2007 | Jovanovich et al. |
| 2007/0255362 A1 | 11/2007 | Levinson et al. |
| 2008/0003685 A1 | 1/2008 | Goix et al. |
| 2008/0014574 A1 | 1/2008 | Viator et al. |
| 2008/0021674 A1 | 1/2008 | Puskas |
| 2008/0069733 A1 | 3/2008 | Maltezo et al. |
| 2008/0144037 A1 | 6/2008 | Mueth et al. |
| 2008/0166188 A1 | 7/2008 | Gilbert et al. |
| 2008/0195020 A1 | 8/2008 | Cabuz et al. |
| 2008/0213821 A1 | 9/2008 | Liu et al. |
| 2008/0248966 A1 | 10/2008 | Hansen et al. |
| 2008/0261295 A1 | 10/2008 | Butler et al. |
| 2008/0292555 A1 | 11/2008 | Ye et al. |
| 2008/0299013 A1 | 12/2008 | Trieu et al. |
| 2008/0309919 A1 | 12/2008 | Birmingham et al. |
| 2008/0311005 A1 | 12/2008 | Kim et al. |
| 2009/0004652 A1 | 1/2009 | Rubin et al. |
| 2009/0029870 A1 | 1/2009 | Ward et al. |
| 2009/0032449 A1 | 2/2009 | Mueth et al. |
| 2009/0042241 A1 | 2/2009 | Yu-Chong et al. |
| 2009/0051912 A1 | 2/2009 | Salazar et al. |
| 2009/0114285 A1 | 5/2009 | Hashimoto et al. |
| 2009/0125242 A1 | 5/2009 | Choi et al. |
| 2009/0141279 A1 | 6/2009 | Hillmer |
| 2009/0156932 A1 | 6/2009 | Zharov |
| 2009/0170149 A1 | 7/2009 | Viator et al. |
| 2009/0176271 A1 | 7/2009 | Durack et al. |
| 2009/0201504 A1 | 8/2009 | Ho et al. |
| 2009/0225319 A1 | 9/2009 | Lee et al. |
| 2009/0281250 A1 | 11/2009 | DeSimone et al. |
| 2009/0290156 A1 | 11/2009 | Popescu et al. |
| 2010/0044570 A1 | 2/2010 | McGill et al. |
| 2010/0068723 A1 | 3/2010 | Jovanovich et al. |
| 2010/0079516 A1 | 4/2010 | Nakazawa |
| 2010/0167336 A1 | 7/2010 | Son et al. |
| 2010/0171954 A1 | 7/2010 | Quake et al. |
| 2010/0216208 A1 | 8/2010 | Mueth et al. |
| 2010/0248362 A1 | 9/2010 | Durack et al. |
| 2010/0330693 A1 | 12/2010 | Chapin et al. |
| 2011/0001963 A1 | 1/2011 | Durack |
| 2011/0003303 A1 | 1/2011 | Pagano et al. |
| 2011/0003324 A1 | 1/2011 | Durack |
| 2011/0003325 A1 | 1/2011 | Durack |
| 2011/0003330 A1 | 1/2011 | Durack |
| 2011/0008764 A1 | 1/2011 | Silva et al. |
| 2011/0008767 A1 | 1/2011 | Durack |
| 2011/0008817 A1 | 1/2011 | Durack |
| 2011/0008818 A1 | 1/2011 | Durack |
| 2011/0075928 A1 | 3/2011 | Jeong et al. |
| 2011/0076712 A1 | 3/2011 | Gilligan et al. |
| 2011/0090500 A1 | 4/2011 | Hu et al. |
| 2011/0096327 A1 | 4/2011 | Papautsky et al. |
| 2011/0190146 A1 | 8/2011 | Boehm et al. |
| 2011/0223654 A1 | 9/2011 | Holman et al. |
| 2011/0256523 A1 | 10/2011 | Mendele et al. |
| 2011/0263747 A1 | 10/2011 | Doyle et al. |
| 2011/0294139 A1 | 12/2011 | Takeda |
| 2012/0009619 A1 | 1/2012 | Gilbert et al. |
| 2012/0028366 A1 | 2/2012 | Krager et al. |
| 2012/0033220 A1 | 2/2012 | Kotidis et al. |
| 2012/0033697 A1 | 2/2012 | Goyal et al. |
| 2012/0081709 A1 | 4/2012 | Durack |
| 2012/0082362 A1 | 4/2012 | Diem et al. |
| 2012/0107805 A1 | 5/2012 | Neas et al. |
| 2012/0122084 A1 | 5/2012 | Wagner et al. |
| 2012/0138152 A1 | 6/2012 | Villamuel et al. |
| 2012/0183947 A1 | 7/2012 | Mueth et al. |
| 2012/0196356 A1 | 8/2012 | Wagner et al. |
| 2012/0199741 A1 | 8/2012 | Wagner et al. |
| 2012/0199742 A1 | 8/2012 | Wagner et al. |
| 2012/0202237 A1 | 8/2012 | Sedoglavich et al. |
| 2012/0202277 A1 | 8/2012 | Wagner et al. |
| 2012/0202278 A1 | 8/2012 | Wagner et al. |
| 2012/0204628 A1 | 8/2012 | Wagner et al. |
| 2012/0225474 A1 | 9/2012 | Wagner et al. |
| 2012/0225475 A1 | 9/2012 | Wagner et al. |
| 2012/0273054 A1 | 11/2012 | Lou et al. |
| 2012/0287419 A1 | 11/2012 | Sharpe et al. |
| 2012/0295263 A1 | 11/2012 | Cantor et al. |
| 2012/0307244 A1 | 11/2012 | Lou et al. |
| 2013/0121877 A1 | 5/2013 | Ono |
| 2013/0164731 A1* | 6/2013 | Cimino .................. A61M 1/88 435/284.1 |
| 2013/0164773 A1 | 6/2013 | Bardell et al. |
| 2013/0200277 A1 | 8/2013 | Li et al. |
| 2013/0224843 A1 | 8/2013 | Evans et al. |
| 2013/0252237 A1 | 9/2013 | Wagner |
| 2013/0295602 A1 | 11/2013 | Fowler |
| 2013/0313170 A1 | 11/2013 | Bohm et al. |

(56) References Cited

U.S. PATENT DOCUMENTS

| | | |
|---|---|---|
| 2014/0033808 A1 | 2/2014 | Ding et al. |
| 2014/0050540 A1 | 2/2014 | Gilbert et al. |
| 2014/0091014 A1 | 4/2014 | Wagner et al. |
| 2014/0224710 A1 | 8/2014 | Di Carlo et al. |
| 2014/0273192 A1 | 9/2014 | Sharpe |
| 2014/0287243 A1 | 9/2014 | Weber et al. |
| 2014/0318645 A1 | 10/2014 | Koksal |
| 2014/0339446 A1 | 11/2014 | Yamamoto et al. |
| 2014/0361148 A1 | 12/2014 | Popescu et al. |
| 2015/0064694 A1 | 3/2015 | Sadri |
| 2015/0114093 A1 | 4/2015 | Appleyard et al. |
| 2015/0192511 A1 | 7/2015 | Wagner et al. |
| 2015/0198517 A1 | 7/2015 | Simpson et al. |
| 2015/0276588 A1 | 10/2015 | Marshall et al. |
| 2016/0004060 A1 | 1/2016 | Simpson et al. |
| 2016/0123858 A1 | 5/2016 | Kapur et al. |
| 2016/0199835 A1 | 7/2016 | Tachibana et al. |
| 2017/0016813 A1 | 1/2017 | Wagner et al. |
| 2017/0181425 A1* | 6/2017 | Burbank ............ A01N 1/0252 |
| 2017/0333902 A1* | 11/2017 | Masaeli ............ G01N 15/1484 |
| 2018/0266937 A1 | 9/2018 | de Wagenaar et al. |
| 2019/0025212 A1 | 1/2019 | Evans |
| 2019/0040356 A1 | 2/2019 | Durack et al. |
| 2019/0071725 A1 | 3/2019 | Roti-Roti et al. |
| 2019/0160439 A1 | 5/2019 | Muto et al. |
| 2019/0187044 A1 | 6/2019 | Appleyard et al. |
| 2019/0390164 A1 | 12/2019 | Morjal et al. |
| 2020/0070152 A1 | 3/2020 | Kasai et al. |
| 2022/0025443 A1 | 1/2022 | Korani et al. |
| 2022/0026341 A1 | 1/2022 | Appleyard et al. |

FOREIGN PATENT DOCUMENTS

| | | |
|---|---|---|
| CN | 1482369 | 3/2004 |
| CN | 1886315 | 12/2006 |
| CN | 101189504 | 5/2008 |
| CN | 203952247 U | 11/2014 |
| CN | 105532638 A | 5/2016 |
| CN | 205323294 U | 6/2016 |
| CN | 105831105 A | 8/2016 |
| CN | 206014950 U | 3/2017 |
| CN | 207418761 U | 5/2018 |
| CN | 109221081 A | 1/2019 |
| CN | 109497040 A | 3/2019 |
| CN | 109517787 A | 3/2019 |
| EP | 0057907 | 8/1982 |
| EP | 0282994 | 9/1988 |
| EP | 0679325 | 7/1994 |
| EP | 0471758 A1 | 9/1996 |
| FR | 2798557 | 3/2001 |
| GB | 502971 | 5/1939 |
| GB | 2507959 | 5/2014 |
| JP | 57-131451 | 8/1982 |
| JP | 58090513 | 5/1983 |
| JP | S 64-26125 A | 1/1989 |
| JP | 64074451 | 3/1989 |
| JP | 02105041 | 4/1990 |
| JP | 03297385 | 12/1991 |
| JP | H0526799 | 2/1993 |
| JP | 06265452 | 9/1994 |
| JP | 06327494 | 11/1994 |
| JP | 07024309 | 1/1995 |
| JP | 07286953 | 10/1995 |
| JP | 2552582 | 11/1996 |
| JP | H10512952 | 12/1998 |
| JP | H11508182 | 7/1999 |
| JP | 2000146819 | 5/2000 |
| JP | 2000512541 | 9/2000 |
| JP | 2001504936 | 4/2001 |
| JP | 2002503334 | 1/2002 |
| JP | 2002153260 | 5/2002 |
| JP | 2003106980 | 4/2003 |
| JP | 2003515738 | 5/2003 |
| JP | 2004093553 | 3/2004 |
| JP | 2005502482 | 1/2005 |
| JP | 2005530986 | 10/2005 |
| JP | 2006524054 | 10/2006 |
| JP | 2007-514522 A | 6/2007 |
| JP | 2007148981 | 6/2007 |
| JP | 2007514522 | 6/2007 |
| JP | 2007515936 | 6/2007 |
| JP | 2008533440 | 8/2008 |
| JP | 2008261295 A1 | 10/2008 |
| JP | 2009085872 A | 4/2009 |
| JP | 2009115672 A | 5/2009 |
| JP | 2010117197 | 5/2010 |
| JP | 2010151777 | 7/2010 |
| JP | 2010190680 | 9/2010 |
| JP | 2011145185 | 7/2011 |
| JP | 2014503195 | 2/2014 |
| WO | WO9622521 | 7/1996 |
| WO | WO9700442 | 1/1997 |
| WO | WO1997030338 A1 | 8/1997 |
| WO | WO9739338 | 10/1997 |
| WO | WO9747390 | 12/1997 |
| WO | WO9810267 | 3/1998 |
| WO | WO99/39223 | 8/1999 |
| WO | WO20000070080 A1 | 11/2000 |
| WO | WO0118400 | 3/2001 |
| WO | WO0131315 | 5/2001 |
| WO | WO2001040766 | 6/2001 |
| WO | WO0185913 | 11/2001 |
| WO | WO2002006778 A1 | 1/2002 |
| WO | WO200241906 | 5/2002 |
| WO | WO2002081183 A1 | 10/2002 |
| WO | WO02087792 | 11/2002 |
| WO | WO03024163 | 3/2003 |
| WO | WO03062867 | 7/2003 |
| WO | WO03078065 A1 | 9/2003 |
| WO | WO2003078065 | 9/2003 |
| WO | WO2004012133 | 2/2004 |
| WO | WO2004029221 | 4/2004 |
| WO | WO2004043506 A1 | 5/2004 |
| WO | WO2004088283 | 10/2004 |
| WO | WO20040088283 A1 | 10/2004 |
| WO | WO2005023391 | 3/2005 |
| WO | WO2005075629 | 8/2005 |
| WO | WO20050075629 A1 | 8/2005 |
| WO | WO2006119806 | 11/2006 |
| WO | WO20060119806 A1 | 11/2006 |
| WO | WO2007008495 A2 | 1/2007 |
| WO | WO2007133710 A2 | 11/2007 |
| WO | WO2008114458 | 9/2008 |
| WO | WO2008126064 A2 | 10/2008 |
| WO | WO2008130977 A1 | 10/2008 |
| WO | WO2009032449 A1 | 3/2009 |
| WO | WO2009134395 | 11/2009 |
| WO | WO2010129441 | 11/2010 |
| WO | WO2012068287 A2 | 5/2012 |
| WO | WO2012112641 | 8/2012 |
| WO | WO20120112641 A1 | 8/2012 |
| WO | WO20130018273 A1 | 2/2013 |
| WO | WO2013173446 | 11/2013 |
| WO | WO2005037471 A1 | 9/2014 |
| WO | 2015038494 | 3/2015 |
| WO | WO2015063552 | 5/2015 |
| WO | WO2018047011 A2 | 3/2018 |
| WO | WO2018047011 A2 | 5/2018 |
| WO | WO2018151680 A1 | 8/2018 |
| WO | WO2020092321 A1 | 5/2020 |
| WO | WO2020182193 A1 | 9/2020 |

OTHER PUBLICATIONS

Trial Transcript, Sep. 5, 2019 (a.m.); *ABS Global, Inc. v. Inguran, LLC d/b/a Sexing Technologies*, Case Nos. 17-cv-446 and 14-cv-503, United States District Court for the Western District of Wisconsin.

Brief in Support of ABS Global, Inc. and Genus PLC's Rule 50(8) Motion for Judgment as a Matter of Law and Rule 59 Motion for a New Trial, *ABS Global, Inc. v. Inguran, LLC d/b/a Sexing Technologies*, Case No. 14-cv-503, United States District Court for the Western District of Wisconsin. Filed Sep. 2, 2016.

(56) References Cited

OTHER PUBLICATIONS

Inguran, LLC and XY, LLC's Response to ABS Global, Inc. and Genus PLC's Rule 50(8) Motion Fof Judgment as a Matter of Law and Rule 59 Motion for New Trial, pp. 9-28, 33-36, 73-74. Filed Sep. 23, 2016.

ST's Response to ABS's Renewed Motion for Judgment as a Matter of Law That the Asserted Claims of the '987 Patent Are Invalid for Lack of Enablement and, in the Alternative, for a New Trial, *ABS Global, Inc. v. Inguran, LLC d/b/a Sexing Technologies*, Case No. 14-cv-503, United States District Court for the Western District of Wisconsin. Filed: Jul. 24, 2020.

Clinical Laboratory Instruments and In Vitro Diagnostic Reagents, Personnel Department of the State Food and Drug Administration, et al., pp. 17-21, China Medical Science and Technology Publishing House, Oct. 31, 2010).

DiCarlo "Continuous inertial focusing, ordering, and separation of particles in microchannels" BioMEMS Resource Center, Center for Engineering in Medicine and Surgical Services, Massachusetts General Hospital, Nov. 27, 2007, PNAS, 18892-18897, vol. 104, No. 48.

DiCarlo "Equilibrium Separation and Filtration of Particles Using Differential Inertial Focusing" BioMEMS Resource Center, Center for Engineering in Medicine and Surgical Services, Massachusetts General Hospital, Anal Chem 2008, 8, 2204-2211.

DiCarlo "Inertial Microfluidics: High-Throughput Focusing and Separation of Cells and Particles" BioMEMS Resource Center, Center for Engineering in Medicine, Massachusetts General Hospital, Twelfth International Conference on Miniaturized Systems for Chemistry and Life Sciences, Oct. 12-16, 2008, San Diego, California, USA.

Altendorf et al., "Results Obtained Using a Prototype Microfluidics-Based Hematology Analyzer," in Proceedings of the microTAS 1998 Symposium, 73-76 (Oct. 1998).

Nieuwenhuis et al., "Particle-Shape Sensing-Elements for Integrated Flow Cytometer," in Proceedings of the microTAS 2001 Symposium, 357-358 (Oct. 21, 2001).

Nieuwenhuis et al. "Virtual Flow Channel: A Novel Micro-fluidics System with Orthogonal, Dynamic Control of Sample Flow Dimensions," in Proceedings of the microTAS 2002 Symposium, vol. 1, 103-105 (Nov. 3, 2002).

Nieuwenhuis, J., et al. "Integrated flow-cells for novel adjustable sheath flows." Lab Chip, 2003, 3, 56-61 (Mar. 2003).

Shoji, S., et al. "Design and fabrication of micromachined chemical/biochemical systems." Riken Rev., vol. 36, pp. 8-11, 2001.

Lin, C., et al. "A Novel Microflow Cytometer with 3-dimensional Focusing Utilizing Dielectrophoretic and Hydrodynamic Forces." The Sixteenth Annual International Conference on Micro Electro Mechanical Systems, 2003. MEMS-03 Kyoto IEEE, Kyoto, Japan, 2003, pp. 439-442.

Miyake et al., "A Development of Micro Sheath Flow Chamber," in Proceedings of the IEEE Micro Electro Mechanical Systems Workshop 1991, 265-270 (Jan. 1991).

Tashiro et al., "Design and Simulation of Particles and Biomolecules Handling Micro Flow Cells with Three-Dimensional Sheath Flow," in Proceedings of the microTAS 2000 Symposium, 209-212 (May 14, 2000).

Weigl, B. et al. "Design and Rapid Prototyping of Thin-Film Laminate-Based Microfluidic Devices." Biomedical Microdevices, 3:4, pp. 267-274, 2001.

Blankenstein, G. et al. "Modular concept of a laboratory on a chip for chemical and biochemical analysis." Biosensors & Bioelectronics, vol. 13. No 3-4, pp. 427-438, 1998.

Shapiro, Practical Flow Cytometry, 15-17, 133-135 (3rd ed. 1995).
Shapiro, Practical Flow Cytometry, 55-57, 166-169 (4th ed. 2003).
International Search Report for PCT Patent Application No. PCT/IB2014/001425 dated Apr. 28, 2015.

Herweijer, H. et al., "High Speed Photodamage Cell Selection Using Bromodeoxyuridine/Hoechst 33342 Photosensitized Cell Killing", Radiobiological Institute TNO, Rotterdam, The Netherlands, Jun. 1, 1987.

Johnson, L.A., et al., "Sex Preselection: High-Speed Flow Cytometric Sorting of X and Y Sperm for Maximum Efficiency" U.S. Dept. of Agriculture, Beltsville, MD, Sep. 23, 1999.

Bazyer H., et al., "Views and Reviews—Compact 151W Green Laser with U-Type Resonator for Prostate Surgery", Optics & Laser Technology, vol. 47, Apr. 27, 2013, 237-241.

Keij, J. et al., "High-Speed Photodamage Cell Sorting: An Evaluation of the Zapper Prototype", Methods in Cell Biology, 1994; pp. 371-386, vol. 42, Chapter 22, Academic Press, Inc.

International Search Report and Written Opinion dated Mar. 7, 2014 in connection with PCT/US2013/050669.

Kachel, V, et al., "Uniform Lateral Orientation, caused by Flow Forces, of Flat Particles in Flow-Through Systems", The Journal of Histochemistry and Cytochemistry, vol. 25, No. 7, pp. 774-780, 1977.

Notice of Allowance issued in U.S. Appl. No. 13/943,322 dated Sep. 12, 2014.

Fulwler, M., "Hydrodynamic Orientation of Cells", The Journal of Histochemistry and Cytochemistry, vol. 25, No. 7, pp. 781-783, 1977.

Khodjakov A., et al., "A Synergy of Technologies: Combining Laser Microsurgery with Green Fluorescent Protein Tagging", Cell Motility and the Cytoskeleton 38:311-317 (1997), Division of Molecular Medicine and Department of Biomedical Sciences, Albany, New York.

Canadian Office Action, Application No. 2,929,275, dated May 4, 2020, 8 pages.

Australian Office Action, Application No. 2019202882, dated Mar. 26, 2020, 3 pages.

Brazilian Office Action, Application No. BR122017012966-0, dated Jun. 2, 2020, 6 pages.

Japan Patent Office, "Reconsideration Report by Examiner before Appeal," issued in connection with Japanese Patent Application No. 2016-551082, dated Jul. 12, 2019, 17 pages. 20090114285.

Intellectual Property India, "Examination Report," issued in connection with Indian Patent Application No. 3425/DELNP/2015, dated Jan. 20, 2020, 6 pages.

European Patent Office, "Extended European Search Report," issued in connection with patent application No. 19182993.6, dated Oct. 21, 2019, 11 pages.

China National Intellectual Property Administration, "Second Office Action," issued in connection with Chinese Patent Application No. 201480071952.0, dated Nov. 26, 2018, 34 pages.

China National Intellectual Property Administration, "Decision of Rejection," issued in connection with Chinese Patent Application No. 201480071952.0, dated Mar. 4, 2019, 19 pages.

IP Australia, "Examination Report No. 1 for Standard Patent Application," issued in connection with Australian Patent Application No. 2014343391, dated Sep. 4, 2018, 3 pages.

International Preliminary Report on Patentability, issued in connection with application PCT/IB/001425, dated May 3, 2016, 11 pages.

Japan Patent Office, "Non Final Notice of Reasons for Rejection," issued in connection with Japanese Patent Application No. 2016-551082, dated Apr. 24, 2018, 5 pages.

New Zealand IP Office, "First Examination Report," issued in connection with New Zealand Patent Application No. 720575, dated Sep. 9, 2016, 5 pages.

New Zealand IP Office, "Further Examination Report," issued in connection with New Zealand Patent Application No. 720575, dated Apr. 28, 2017, 3 pages.

State Intellectual Property Office of People's Republic of China, "Notification of First Office Action," issued in connection with Chinese Patent Application No. 201480071952.0, dated Mar. 16, 2018, 31 pages.

New Zealand IP Office, "Further Examination Report," issued in connection with New Zealand Patent Application No. 735496, dated Aug. 31, 2018, 2 pages.

Drobnis et al., Cold Shock Damage is due to Lipid Phase Transitions in Cell Membranes: A Demonstration Using Sperm as a Model, The Journal of Experimental Zoology, 1993, 265:432-437.

Way et al., Comparison of four staining methods for evaluating acrosome status and viability of ejaculated and cauda epididymal bull spermatozoa, Theriogenology, 1995, 43(8): 1301-1316.

(56) References Cited

OTHER PUBLICATIONS

Marian et al., Hypo-osmotic Shock Induces an Osmolality-dependent Permeabilization and Structural Changes in the Membrane of Carp Sperm, 1993, 41(2):291-297.
Molecular Probes Inc., Product Information, Influx Pinocylic Cell-Loading Reagent (1-14402), Revised Feb. 1, 2001, 1-7.
Parks, Processing and Handling Bull Semen for Artificial Insemination—Don't Add Insult to Injury!, Department of Animal Sciences, Cornell University, 2001, retrieved on May 29, 2015, retrieved from the internet: http://www/ansci.cornell.edu/bullsemen.pdf.
Mammal (Online Datasheet), Wikipedia, 2003, retrieved on Aug. 13, 2018, retrieved from internet: http://web.archive.org/web/20031230110838/hllps://en.wikipedia.org/wiki/Mammal.
International Searching Authority, "International Search Report and Written Opinion," issued in connection with International Patent Application No. PCT/IB2016/000295, dated Oct. 14, 2016, 19 pages.
International Bureau, "International Preliminary Report on Patentability," issued in connection with International Patent Application No. PCT/IB2016/000295, dated Aug. 31, 2017, 14 pages.
Japan Patent Office, "Office Action," issued in connection with Japanese Patent Application No. 2017-543990, dated Jul. 31, 2019, 23 pages.
Di Carlo et al. "Equilibrium Separation and Filtration of Particles Using Differential Inertial Focusing" Anal. Chem. 2008, 80, 2204-2211 (Year: 2008).
Hydraulic Diameter, Neutrium, Apr. 1, 2012, https://neutrium.net/fluid-flow/hydraulic-diameter/ (Year: 2012).
Gossett et al. "Particle Focusing Mechanisms in Curving Confined Flows" Anal. Chem. 2009, 81, 8459-8465 (Year: 2009).
Di Carlo et al. "Continuous inertial focusing, ordering, and separation of particles in microchannels" PNAS Nov. 27, 2007 vol. 104 No. 48 18893 (Year: 2007).
USPTO, "Non-Final Office Action," issued in connection with U.S. Appl. No. 17/403,642, dated Nov. 29, 2021, 13 pages.
Intellectual Property India, "Examination Report," issued in connection with Indian Patent Application No. 201917009874, dated Nov. 25, 2021, 6 pages.
Australian Office Action, Application No. 2017323502, dated Oct. 22, 2021, 6 pages.
Al-Holy et al., "The Use of Fourier Transform Infrared Spectroscopy to Differentiate Escherichia Coli O157:H7 from Other Bacteria Inoculated Into Apple Juice," Food Microbiology, vol. 23, 2006, 162-168.
Alberts et al., "Molecular Biology of the Cell, 5th edition," New York: Garland Science, 2008, p. 1293.
Barcot et al., "Investigation of Spermatozoa and Seminal Plasma by Fourier Transform Infrared Spectroscopy," Applied Spectroscopy, vol. 61, No. 3, Mar. 2007, pp. 309-313.
Bassan et al; "Reflection Contributions to the Dispersion Artefact in FTIR Spectra of Single Biological Cells," Analyst, vol. 134, Apr. 9, 2009, pp. 1171-1175.
Bassan et al; "Resonant Mie Scattering in Infrared Spectrascopy of Biological Materials-Understanding the Dispersion Artefact'," Analyst, vol. 134, 2009, pp. 1586-1593.
Bassan et al; "Resonant Mie Scattering {RMieS} Correction of Infrared Spectra From Highly Scattering Biological Samples," Analyst, vol. 135, No. 2, Feb. 2010, pp. 268-277.
Belkin et al.; "Intra-Cavity Absorption Spectroscopy with Narrow-Ridge Microfluidic Quantum Cascade Lasers,"Applies Express, vol. 15, No. 18, Sep. 3, 2007, pp. 11262-11271.
Boustany et al.; "Microscopic Imaging and Spectroscopy with Scattered Light," Annual Review of Biomedical Engineering, vol. 12, 2010, pp. 285-314.
Chan et al.; "Nondestructive Identification of Individual Leukemia Cells by Laser Trapping Raman Spectroscopy," Analytical Chemistry, vol. 80, No. 6, Mar. 15, 2008, 8 pages.
Chan et al.; "Label-Free Biochemical Characterization of Stem Cells Using Vibrational Spectroscopy," Journal of Biophotonics vol. 2, No. 11, Aug. 5, 2009, pp. 656-668.

Chan et al.; "Label-Free Separation of Human Embryonic Stem Cells {hESCs} and their Cardiac Derivatives using Raman Spectroscopy," Lawrence Livermore Journal, LLNL-JRNL-406938, Sep. 11, 2008, 30 pages.
Chen et al,; "Synchrotron Infrared Measurements of Protein Phosphorylation in Living Single PC12 Cells during Neuronal Differentiation," Analytical Chemistry, vol. 84, 2012, pp. 4118-4125.
Cheng et al., "Laser-Scanning Coherent Anti-Strokes Raman Scattering Microscopy and Applications to Cell Biology," Biophysical Journal, vol. 83, Jul. 2002, pp. 502-509.
Cho et al., "Passively Driven Integrated Microfluidic System for Separation of Motile Sperm," Analytical Chemistry, vol. 75, Apr. 1, 2003, Abstract.
Cho et al., A Microfluidic Device For Separating Motile Sperm From Nonmotile Sperm Via Inter-Streamline.
Cleary et al., "Infrared Surface Plasmon Resonance Biosensor," OSA Biomed, Miami, Florida, Apr. 2010, 6 pages.
Dousseau et al., "On the Spectral Subtraction of Water from the FT-IR Spectra of Aqueous Solutions of Proteins," Applied Spectroscopy, vol. 43, No. 3, 1989, pp. 538-542.
Downes et al., "Optical Spectroscopy for Noninvasive Monitoring of Stem Cell Differentiation," Journal of Biomedicine and Biotechnology, vol. 2010, Article ID 101864, 2010, 10 pages.
Ege, "Organic Chemistry: Structure and Reactivity," Fifth Edition, Boston, MA, Houghton Mifflin Company, 2004, pp. 453-457.
European Patent Office, "Extended European Search Report," issued in connection with European Patent Application No. 11841869.8, dated Feb. 15, 2018, 9 pages.
Fu et al., "A Microfabricated Fluorescence-Activated Cell Sorter," Nature Biotechnology, vol. 17, Nov. 1999, pp. 1109-1111.
Green et al., "Flow Cytometric Determination of Size and Complex Refractive Index for Marine Particles: Comparison with Independent and Bulk Estimates," Applied Optics, vol. 42, No. 3, Jan. 20, 2003, pp. 526-541.
Harvey et al., "Discrimination of Prostate Cancer Cells by Reflection Mode FTIR Photoacoustic Spectroscopy," The Analyst, vol. 132, 2007, pp. 292-295.
Herzenberg et al., "Fluorescence-activated Cell Sorting," Scientific American, vol. 234, Mar. 1976, pp. 108-117.
Holman et al., "Synchrotron-Based FTIR Spectromicroscopy: Cytotoxicity and Heating Considerations," Journal of Biological Physics, vol. 29, 2003, pp. 275-286.
Holman et al., "IR Spectroscopic Characteristics of Cell Cycle and Cell Death Probed by Synchrotron Radiation Based Fourier Transform IR Spectromicroscopy," Biopolymers (Biospectroscopy) vol. 57, 2000, pp. 329-335.
Holman et al., "Tracking Chemical Changes in a Live Cell: Biomedical Applications of SR-FTIR Spectromicroscopy, "Lawrence Berkeley National Laboratory, http://escholarship.org/uc/item/9k185794, Berkeley, CA Jul. 25, 2002, 34 pages.
Huser et al., "Raman Spectroscopy of DNA Packaging in Individual Human Sperm Cells Distinguishes Normal From Abnormal Cells," Journal of Biophotonics, vol. 2, No. 5, 2009, pp. 322-332.
Intel, "Intel C-bank Tunable Laser, Performance and Design," White Paper, May 2003, 14 pages.
International Searching Authority, "International Search Report and Written Opinion," International Patent Application No. PCT/US2013/41123, dated Aug. 19, 2013, 12 pages.
International Search Authority, "International Preliminary Report on Patentability," International Patent Application No. PCT/US2011/061046, dated May 30, 2013, 7 pages.
International Searching Authority, "International Preliminary Report on Patentability," International Patent Application No. PCT/US2013/041123, dated Nov. 18, 2014, 7 pages.
Japan Patent Office, "Office Action," issued in connection with Japanese Patent Application No. 2013-539983, dated Jul. 8, 2015, 6 pages.
Japan Patent Office, "Office Action," issued in connection with Japanese Patent Application No. 2013-539983, dated Jul. 2, 2016, 6 pages.

(56) References Cited

OTHER PUBLICATIONS

Japan Patent Office, "Office Action," issued in connection with Japanese Patent Application No. 2016-198323, dated Oct. 2, 2017, 3 pages.

Japan Patent Office, "Office Action," issued in connection with Japanese Patent Application No. 2016-198323, dated Jul. 25, 2018, 9 pages.

Lee et al., "DFB Quantum Cascade Laser Arrays," IEEE Journal of Quantum Electronics, vol. 45, No. 5, May 9, pp. 554-565.

Ibbus et al., "Incidence of Chromosome Aberrations in Mammalian Sperm Stained with Hoechst 33342 and UV- aser Irradiated During Flow Sorting," Mutation Research, vol. 182, 1987, pp. 265-274.

Malone, Jr., "Infrared Microspectroscopy: A Study of the Single Isolated Bread Yeast Cell," Thesis, The Ohio State University, 2010, 162 pages.

Meister et al., "Confocal Raman Microspectroscopy as an Analytical Tool to Assess the Mitochondral Status in Human Spermatozoa," Analyst, vol. 135, 2010, pp. 1370-1374.

Miyamoto et al., "Label-free Detection and Classification of DNA by Surface Vibration Spectroscopy in Conjugation with Electrophoresis," Applied Physics Letters, vol. 86, No. 053902, 2005, 3 pages.

Mohlenhoff et al., "Mie-Type Scattering and Non-Beer-Lambert Absorption Behavior of Human Cells in Infared Microspectroscopy," Biophysical Journal, vol. 88, May 2005, pp. 3635-3640.

Montag et al., "Laser-induced Immobilization and Plasma Membrane Permeabilization in Human Spermatozoa," Human Reproduction, vol. 15, No. 4, 2000, pp. 846-852.

Mourant et al., "Methods for Measuring the Infrared Spectra of Biological Cells," Physics in Medicine and Biology, vol. 48, 2003, pp. 243-257.

Van Munster, "Interferometry in Flow to Sort Unstained X-and Y-Chromosome-Bearing Bull Spermatozoa,"Cytometry, vol. 47, 2002, pp. 192-199.

Rajagopalan et al., "Aneuploidy and Cancer," Nature, vol. 432, Nov. 2004, pp. 338-341.

Ropcke et al., "Application of Mid-Infrared Tuneable Diode Laser Absorption Spectroscopy to Plasma Diagnostics: A Review," Plasma Sources Science and Technology, vol. 15, 2006, S148-S168.

Schaden et al., "Quantum Cascade Laser Modulation for Correction of Matrix-Induced Background Changes in Aqueous Samples," Applied Physics B, vol. 86, 2007, pp. 347-351.

Sandt et al., "Identification of Spectral Modifications Occurring during Reprogramming of Somatic Cells," PLoS ONE, vol. 7, Issue 4, e30743, Apr. 2012, 7 pages.

Jokinen, Ville, et al. "Durable superhydrophobicity in embossed CYTOP fluoropolymer micro and nanostructures", Colloids and Surfaces A: Physicochemical and Engineering Aspects, vol. 434, 2013, pp. 207-212.

Forsberg, Pontus, Fredrik Nikolajeff, and Mikael Karlsson, "Cassie-Wenzel and Wenzel-Cassie transitions on immersed superhydrophobic surfaces under hydrostatic pressure", Soft Matter, vol. 7, No. 1, 2011, pp. 104-109.

Lu, Hang, Martin A. Schmidt, and Klavs F. Jensen, "Photochemical reactions and on-line UV detection in microfabricated reactors", Lab on a Chip, vol. 1, No. 1, 2001, pp. 22-28.

Japan Patent Office, "Office Action," issued in connection with Japanese Patent Application No. 2019-513891, dated Jun. 24, 2021, 11 pages.

Brazilian Office Action, Application No. BR112019004727-1, dated Jul. 6, 2021, 4 pages.

Australian Office Action, Application No. 2017323502, dated Jun. 28, 2021, 6 pages.

China Office Action, Application No. 201780056064.5, dated Apr. 26, 2021, 8 pages.

China Office Action, Application No. 201780056064.5, dated Nov. 4, 2020 11 pages.

Europe Office Action, Application No. 17808998.3, dated Jul. 21, 2020.

Pedreira Carlos E et al.: "Overview of clinical flow cytometry data analysis: recent advances and future challenges", Trends in Biotechnology, Elsevier Publications, Cambridge, GB, vol. 31, No. 7, Jun. 5, 2013.

China Patent Office, "The Third Office Action," issued in connection with China Patent Application No. 201480071952.0, dated Jul. 23, 2020, 23 pages.

Intellectual Property India, "Examination Report," issued in connection with Indian Patent Application No. 3429/DELNP/2015, dated Mar. 26, 2018, 6 pages.

European Patent Office, " European Search Report," issued in connection with patent application No. 20167363.9, dated Jul. 21, 2020, 9 pages.

Japan Patent Office, "Notice of Reasons for Refusal," issued in connection with Japan Patent Application No. 2018-220397, dated Aug. 5, 2020, 3 pages.

European Patent Office, "Examination Report," issued in connection with European Patent Application No. 16723498.8, dated Oct. 12, 2020, 6 pages.

European Patent Office, "European Search Report," issued in connection with European Patent Application No. 14168200.5, dated Mar. 20, 2015, 12 pages.

European Patent Office, "European Search Report," issued in connection with European Patent Application No. 17172322.4, dated Aug. 24, 2017, 8 pages.

European Patent Office, "European Search Report," issued in connection with European Patent Application No. 15160613.4, dated Jul. 24, 2015, 14 pages.

European Patent Office, "Communication pursuant to Article 94(3) EPC," issued in connection with European Patent Application No. 17172322.4, dated Aug. 14, 2018, 5 pages.

European Patent Office, "Communication pursuant to Article 94(3) EPC," issued in connection with European Patent Application No. 11193936.9, dated Dec. 11, 2015, 3 pages.

European Patent Office, "Communication pursuant to Article 94(3) EPC," issued in connection with European Patent Application No. 15160613.4, dated Jul. 11, 2016, 4 pages.

Hori et al., "Cell fusion by optical trapping with laser-involves contacting different cells with each other then imparting high voltage pulse to cells," WPI/Thompson, Dec. 27, 1991, Abstract, 1 page.

Japan Patent Office, "Notification of Reasons for Refusal," issued in connection with Japanese Patent Application No. 2016-185743, dated Jul. 3, 2018, 7 pages.

Japan Patent Office, "Final Notification of Reasons for Rejection," issued in connection with Japanese Patent Application No. 2011-256171, dated Oct. 28, 2014, 5 pages.

Japan Patent Office, "Decision for Grant," issued in connection with Japanese Patent Application No. 2015-091320, dated May 6, 2017, 7 pages.

Japan Patent Office, "Final Notification of Reasons for Rejection," issued in connection with Japanese Patent Application No. 2015-091320, dated Mar. 22, 2016, 22 pages.

Japan Patent Office, "Notification of Reasons for Refusal," issued in connection with Japanese Patent Application No. 2016-185743, dated Jul. 26, 2017, 2 pages.

Smith et al., "Inexpensive Optical Tweezers for Undergraduate Laboratories," Am. J. Phys., vol. 67, No. 1, Jan. 1999, 10 pages.

Takayama et al., "Patterning Cells and Their Environments Using Multiple Laminar Fluid Flows in Capillary Networks," Proceedings of National Academy of Sciences, vol. 96, 1999, 4 pages.

Ts'O, Basic Principles in Nucleic Acid Chemistry, National Library of Medicine, 1974, pp. 311-387.

Japan Patent Office; "Notice of Reasons for Refusal,"issued in connection with Japanese Patent Application No. 2019-088655, dated Feb. 18, 2020, 5 pages.

International Preliminary Report on Patentability corresponding to International Patent Application No. PCT/US2013/050669, dated Jan. 28, 2016, 15 pages.

Supplementary European Search Report for U.S. Appl. No. 13/889,551, dated May 22, 2017, 12 pages.

(56) References Cited

OTHER PUBLICATIONS

State Intellectual Property Office of People's Republic of China, "Second Office Action," issued in connection with Chinese Patent Application No. 201380079634.4, dated Jun. 4, 2018, 14 pages.
Japan Patent Office, "Notice of Reasons for Rejection," issued in connection with Japanese Patent Application No. 2017-168904, dated Jul. 6, 2018, 3 pages.
State Intellectual Property Office of People's Republic of China, "Third Office Action," issued in connection with Chinese Patent Application No. 201380079634.4, dated Nov. 1, 2018, 20 pages.
Japanese Office Action for Application No. 2016-527978 dated Mar. 28, 2017, 8 pages.
State Intellectual Property Office of People's Republic of China, "First Office Action," issued in connection with Chinese Patent Application No. 201380079634.4, dated Jul. 28, 2017, 18 pages.
Indian Patent Application No. 3425/DELNP/2015 Pre-Grant Opposition, mailed Dec. 4, 2020, 138 pages.
Indian Patent Application No. 3425/DELNP/2015 Pre-Grant Opposition, mailed Jul. 21, 2020, 59 pages.
Indian Patent Application No. 3425/DELNP/2015 Pre-Grant Opposition, mailed Jul. 21, 2020, 96 pages.
Indian Patent Application No. 3425/DELNP/2015 Pre- Grant Opposition, mailed Jul. 2, 2020, 137 pages.
Sell, "Cellular Origin of Cancer: Dedifferentiation or Stem Cell Maturation Arrest?", Environmental Health Perspectives, vol. 101, Suppl. 5, 1993, p. 15-26.
Shapiro et al., "Pratical Flow Cytometry," Fourth Edition, New Jersey: John W. Wiley & Sons, 2003, 733 pages.
Sharpe et al., "Advances in Flow Cytometry for Sperm Sexing," Theriogenology, vol. 71, 2009, pp. 4-10.
Short, "Raman Spectroscopy Detects Biochemical Changes Due to Proliferation in Mammalian Cell Cultures," Biophysical Journal, vol. 88, Jun. 2005, pp. 4274-4288.
USPTO, "Non-Final Office Action," issued in connection with U.S. Appl. No. 15/226,899, dated Apr. 12, 2018, 14 pages.
USPTO, "Notice of Allowance," issued in connection with U.S. Appl. No. 15/226,899, dated Aug. 23, 2018, 5 pages.
USPTO, "Notice of Allowance," issued in connection with U.S. Appl. No. 15/226,899, dated Sep. 20, 2018, 6 pages.
USPTO, "Final Office Action," issued in connection with U.S. Appl. No. 15/174,681, dated Jan. 2, 2018, 15 pages.
USPTO, "Final Office Action," issued in connection with U.S. Appl. No. 15/174,681, dated Sep. 14, 2018, 17 pages.
USPTO, "Non-Final Office Action," issued in connection with U.S. Appl. No. 15/174,681, dated May 4, 2017, 13 pages.
USPTO, "Non-Final Office Action," issued in connection with U.S. Appl. No. 15/174,681, dated Apr. 5, 2018, 16 pages.
USPTO, "Notice of Allowance," issued in connection with U.S. Appl. No. 15/174,681, dated Nov. 27, 2018, 10 pages.
USPTO, "Final Office Action," issued in connection with U.S. Appl. No. 13/298,148, dated Oct. 18, 2013, 46 pages.
USPTO, "Non-Final Office Action," issued in connection with U.S. Appl. No. 13/298,148, dated Feb. 5, 2013, 66 pages.
USPTO, "Notice of Allowance," issued in connection with U.S. Appl. No. 13/298,148, dated Sep. 19, 2014, 9 pages.
USPTO, "Office Action," issued in connection with U.S. Appl. No. 13/298,148, dated Sep. 28, 2012, 5 pages.
USPTO, "Final Office Action," issued in connection with U.S. Appl. No. 13/894,831, dated Sep. 10, 2015, 11 pages.
USPTO, "Final Office Action," issued in connection with U.S. Appl. No. 13/894,831, dated Jun. 15, 2017, 19 pages.
USPTO, "Non-Final Office Action," issued in connection with U.S. Appl. No. 13/894,831, dated Dec. 23, 2014, 11 pages.
USPTO, "Non-Final Office Action," issued in connection with U.S. Appl. No. 13/894,831, dated Oct. 5, 2016, 17 pages.
USPTO, "Notice of Allowance," issued in connection with U.S. Appl. No. 13/894,831, dated Apr. 1, 2016, 8 pages.
USPTO, "Notice of Allowance," issued in connection with U.S. Appl. No. 13/894,831, dated Sep. 5, 2017, 9 pages.

Wang et al., Detection of endogenous biomolecules in Barrett's esophagus by Fourier transform infrared spectroscopy, PNAS, vol. 104, No. 40, Oct. 2, 2007, p. 15864-15869.
Webster, Merriam, "Definition of "successive," Merriam Webster's Online Dictionary, accessed at http://www.merriamwebster.com/dictionary/successive," Jun. 18, 2013, 1 page.
Weida et al., "Quantum Cascade Laser Based Replacement for FTIR Microscopy," http://www.daylightsolutions. :: om/assets/003/5308. pdf, accessed online Aug. 2, 2012, 7 pages.
International Bureau, "International Preliminary Report on Patentability," issued in connection with International Patent Application No. PCT/IB2017/001289, dated Mar. 21, 2019, 12 pages.
International Search Report and Written Opinion for Application Serial No. PCT/IP2017/001289, dated Apr. 3, 2018, 21 pages.
Mehrnoush Malek et al: flowDensity: reproducing manual gating of flow cytometry data by automated density-based cell population identification11 , Bioinformatics., vol. 31, No. 4, Oct. 16, 2014 (Oct. 16, 2014), pp. 606-607.
International Search Report and Written Opinion for Application Serial No. PCT/IB2018/001641, dated Jun. 25, 2020 4 pages.
China Patent Office, "The Fourth Office Action," issued in connection with China Patent Application No. 201480071952.0, dated Jan. 3, 2021, 25 pages.
Japan Patent Office, "Notice of Reasons for Refusal," issued in connection with Japan Patent Application No. 2019-088655, dated Oct. 13, 2020, 5 pages.
Johnson LA et al., Flow sorting of X and Y chromosome-bearing spermatozoa into two populations, Gamete Research. Jan. 1987. 16(1):1-9. (Johnson 1987).
Paape et al., Flow Cytometry: A Versatile Tool for Studies on Cells From Domestic Animals, National Cytometry Symposium, Abstract Only, Dec. 14, 1997, https://www.ars.usda.gov/research/publications/publication/?seqNo115=86408.
Keij, J.F. et al., "High-Speed Photodamage Cell Selection Using a Frequency-Doubled Argon Ion Laser." Cytometry 19 (1995): 209-216. (Keij 1995).
Keij, J.F., "Introduction to High-Speed Flow Sorting." Flow and Image Cytometry. Series H: Cell Biology, 95 (1996): 213-227. (Keij 1996).
Johnson LA, Welch GR, Rens W. "The Beltsville sperm sexing technology: high-speed sperm sorting gives improved sperm output for in vitro fertilization and AI." J Anim Sci 1999. 77:213-220.
Counterclaim Defendants ABS Global Inc.'s And Genus PLC's Invalidity Contentions. *ABS Global, Inc.*, v. *Inguran, LLC D/B/A Sexing Technologies* and. *XY, LLC* v. *Genus PLC*. Case No. 14-cv-503 United States District Court for the Western District of Wisconsin; pp. 1, 43-114, and 168-177.
ABS Global, Inc. and Genus PLC's Renewed Motion for Judgment as a Matter of Law That the Asserted Claims of the '987 Patent Are Invalid for Lack of Enablement and, in the Alternative, for a New Trial. *ABS Global, Inc.* v. *Inguran, LLC & XY, LLC* v. *Genus PLC*. Case: 3:14-cv-00503-wmc. Filed on Jul. 3, 2020.
Brief in Support of ABS Global, Inc. and Genus PLC's Motion for Judgment as a Matter of Law That the Asserted Claims of the '987 Patent Are Not Enabled. *Inguran, LLC d/b/a Stgenetics, XY, LLC, and Cytonome/ST, LLC*, Plaintiffs/Counterclaim-Defendants, v. *ABS Global, Inc., Genus PLC, and Premium Genetics (UK) LTD*, Defendants/Counterclaim-Plaintiffs. Case: 3:17-cv-00446 wmc. Filed Sep. 6, 2019.
ABS Global, Inc. and Genus PLC Renewed Motion for Judgment as a Matter of Law That the Asserted Claims of the 987 Patent Are Invalid for Lack of Enablement and, in the Alternative, for a New Trial. *Inguran, LLC d/b/a Stgenetics, XY, LLC, and Cytonome/ST, LLC*, Plaintiffs/Counterclaim-Defendants, v. *ABS Global, Inc., Benus PLC, and Premium Genetics (UK) LTD*, Defendants/Counterclaim-Plaintiffs. Case: 3:17-cv-00446-wmc. filed Jul. 3, 2020.
ABS Global, Inc. and Genus PLC's Reply in Support of Their Renewed Motion for Judgment as a Matter of Law That the Asserted Claims of the '987 Patent Are Invalid for Lack of Enablement and, in the Alternative, for a New Trial. *Inguran, LLC d/b/a Stgenetics, XY, LLC, and Cytonome/ST, LLC*, Plaintiffs/Counterclaim-Defendants, v. *ABS Global, Inc., Genus PLC, and Premium Genet-*

(56) References Cited

OTHER PUBLICATIONS

*ics (UK)* LTD, Defendants/Counterclaim-Plaintiffs. Case: :17-cv-00446-wmc. Filed Aug. 17, 2020.

ABS Global, Inc. and Genus PLC's Motion for Judgment as a Matter of Law That the Asserted Claims of the 987 and '092 Patents Are Invalid. *ABS Global, Inc., Plaintiff/Counterclaim Defendant*, v. *Inguran, LLC d/b/a Sexing Technologies, Defendant/Counterclaim Plaintiff, and XY, LLC*, Intervenor-Defendant/Counterclaim Plaintiff, v. *Genus PLC*, Counterclaim Defendant. Case: 3:14-cv-00503-wmc. Filed Aug. 9, 2016.

ABS Global, Inc. and Genus PLC's Rule 50(8) Motion for Judgment as a Matter of Law and Rule 59 Motion for a New Trial. *ABS Global, Inc.*, Plaintiff/Counterclaim Defendant, v. *Inguran, LLC d/b/a Sexing Technologies*, Defendant/Counterclaim Plaintiff, and *XY, LLC*, Intervenor-Defendant/Counterclaim Plaintiff, V. *Benus PLC*, Counterclaim Defendant. Case: 3:14-cv-00503-wmc. Filed Sep. 2, 2016.

Opinion and Order of the United States District Court for the Western District of Wisconsin. Plaintiff/Counterclaim Defendant, v. *Inguran, LLC d/b/a Sexing Technologies*, Defendant/Counterclaim Plaintiff, and *XY, LLC*, Intervenor-Defendant/Counterclaim Plaintiff, v. *Genus PLC*, Counterclaim Defendant. Case: 3:14-cv-00503-wmc. filed Mar. 31, 2017.

Appeal from the United States District Court for the Western District of Wisconsin. No. 14-CV-503. *ABS Global, NC.*, Plaintiff/Counterclaim Defendant-Appellant, and *Genus PLC*, Counterclaim Defendant-Appellant, v. *Inguran, LLC, doing business as Sexing Technologies*, Defendant/Counterclaim Plaintiff-Appellee, and *XY, LLC*, Intervening Defendant/Counterclaim Plaintiff-Appellee. Case: 3:14-cv-00503-wmc. Filed: Mar. 8, 2019.

Judge's Opinion & Order in Case No. 14-cv-503-wmc. Plaintiff/Counterclaim Defendant, v. *Inguran, LLC dib/a Sexing Technologies*, Defendant/Counterclaim Plaintiff, and *XY, LLC*, Intervenor-Defendant/Counterclaim Plaintiff, v. *Genus PLC*, Counterclaim Defendant. Case: 3:14-cv-00503-wmc. Filed Jul. 21, 2016.

ABS Global Inc. and Genus PLC's Reply in Support of Their Motion for Claim Construction and Partial Summary Judgment, *ABS Global, Inc.* v. *Inguran, LLC d/b/a Sexing Technologies*, Case No. 14-cv-503, United States District Court for the Western District of Wisconsin. Mar. 7, 2016.

Jun et al. "Detecting and estimating contamination of human DNA samples in sequencing and array-based genotype data." The American Journal of Human Genetics 91.5 (2012): 839-848.

International Searching Authority, "International Search Report and Written Opinion," issued in connection with International Patent Application No. PCT/US21/56094, dated Mar. 16, 2022, 22 pages.

China National Intellectual Property Administration, "Notice of Allowance," issued in connection with Chinese Patent Application No. 201480071952.0, dated Mar. 21, 2022, 3 pages.

Australian Office Action, Application No. 2021200818, dated Mar. 4, 2022, 3 pages.

USPTO, "Notice of Allowance," issued in connection with U.S. Appl. No. 16/864,514, dated Jan. 3, 2022, 24 pages.

USPTO, "Notice of Allowance," issued in connection with U.S. Appl. No. 16/419,756, dated Jan. 12, 2022, 16 pages.

USPTO, "Non-Final Office Action," issued in connection with U.S. Appl. No. 17/458,947, dated Dec. 15, 2021, 9 pages.

Di Carlo, "Inertial microfluidics." Lab on a Chip 9.21 (2009): 3038-3046.

USPTO, "Non-Final Office Action," issued in connection with U.S. Appl. No. 16/741,608, dated Mar. 18, 2022, 12 pages.

USPTO, "Notice of Allowance," issued in connection with U.S. Appl. No. 17/412,789, dated Mar. 21, 2022, 30 pages.

USPTO, "Notice of Allowance," issued in connection with U.S. Appl. No. 17/458,947, dated Mar. 31, 2022, 30 pages.

USPTO, "Notice of Allowance," issued in connection with U.S. Appl. No. 17/496,469, dated May 10, 2022, 54 pages.

Intellectual Property India, "Examination Report," issued in connection with Indian Patent Application No. 202147003036, dated Jan. 4, 2022, 5 pages.

China Patent Office, "The Fifth Office Action," issued in connection with China Patent Application No. 2014800719520, dated Oct. 20, 2021, 7 pages.

Intellectual Property India, "Examination Report," issued in connection with Indian Patent Application No. 202017054203, dated Jan. 7, 2022, 5 pages.

USPTO, "Final Office Action," issued in connection with U.S. Appl. No. 17/403,642, dated Mar. 4, 2022, 14 pages.

Kang, et al. "Effect of an osmotic differential on the efficiency of gene transfer by electroporation of fish spermatozoa." Aquaculture 173.1-4 (1999): 297-307. (Year: 1999).

Rieth et al. "Electroporation of bovine spermatozoa to carry DNA containing highly repetitive sequences into oocytes and detection of homologous recombination events." Molecular Reproduction and Development: Incorporating Gamete Research 57.4 (2000): 338-345.

Chamberland et al. "The effect of heparin on motility parameters and protein phosphorylation during bovine sperm capacitation."Theriogenology 55.3 (2001): 823-835. (Year: 2001).

Chan, et al. "Luminescent quantum dots for multiplexed biological detection and imaging." Current opinion in biotechnology 13.1 (2002): 40-46. (Year: 2002).

USPTO, "Non-Final Office Action," issued in connection with U.S. Appl. No. 16/561,146, dated Jan. 21, 2022, 14 pages.

USPTO, "Non-Final Office Action," issued in connection with U.S. Appl. No. 17/496,469, dated Jan. 28, 2022, 13 pages.

USPTO, "Non-Final Office Action," issued in connection with U.S. Appl. No. 17/692,876, dated Sep. 19, 2022, 21 pages.

USPTO, "Notice of Allowance," issued in connection with U.S. Appl. No. 17/403,642, dated Sep. 29, 2022, 24 pages.

USPTO, "Final Office Action," issued in connection with U.S. Appl. No. 16/741,608, dated Jun. 13, 2022, 11 pages.

USPTO, "Non-Final Office Action," issued in connection with U.S. Appl. No. 17/403,642, dated Jul. 13, 2022, 7 pages.

CNIPA, "First Office Action," issued in connection with Chinese Patent Application No. 202080028183.1, dated Jul. 6, 2022, 21 pages.

New Zealand IP Office, "First Examination Report," issued in connection with New Zealand Patent Application No. 751869, dated Aug. 12, 2022, 3 pages.

Canadian Office Action, Application No. 3,034,007, dated Aug. 25, 2022, 3 pages.

USPTO, "Final Office Action," issued in connection with U.S. Appl. No. 16/741,608, dated Oct. 19, 2022, 12 pages.

USPTO, "Non-Final Office Action," issued in connection with U.S. Appl. No. 17/851,319, dated Nov. 2, 2022, 12 pages.

USPTO, "Final Office Action," issued in connection with U.S. Appl. No. 16/279,430, dated Dec. 6, 2022, 18 pages.

China National Intellectual Property Administration, "Second Office Action," issued in connection with Chinese Patent Application No. 202080028183.1, dated Jan. 13, 2023, 23 pages.

European Patent Office, "European Search Report," issued in connection with European Patent Application No. 22190948.4, dated Jan. 23, 2023, 10 pages.

European Patent Office, "Intention to Grant Notice," issued in connection with patent application No. 20167363.9, dated Dec. 15, 2022, 8 pages.

Notice of Allowance issued in U.S. Appl. No. 17/851,319 dated Feb. 15, 2023, 52 pages.

European Patent Office, "European Search Report," issued in connection with European Patent Application No. 20792020.8, dated Dec. 23, 2022, 10 pages.

Brazilian Office Action, Application No. BR112020023607-1, dated Dec. 12, 2022, 5 pages.

USPTO, "Non-Final Office Action," issued in connection with U.S. Appl. No. 17/496,614, dated Dec. 21, 2022, 9 pages.

Ron Bardell et al. "Microfluidic disposables for cellular and chemical detection: CFD model results and fluidic verification experiments," Proc. SPIE 4265, Biomedical Instrumentation Based on Micro- and Nanotechnology, May 21, 2001; doi: 10.1117/12.427961 Invited Paper: BiOS 2001 The International Symposium on Biomedical Optics, 2001, San Jose, CA, United States, 14 pages.

(56) References Cited

OTHER PUBLICATIONS

Notice of Allowance issued in U.S. Appl. No. 17/692,876 dated Feb. 1, 2023, 24 pages.
Notice of Allowance issued in U.S. Appl. No. 16/741,608 dated Feb. 7, 2023, 22 pages.
USPTO, "Non-Final Office Action," issued in connection with U.S. Appl. No. 17/164,710, dated Jun. 26, 2023, 13 pages.
National Institute of Industrial Property (INPI) Argentina, "Examination Report," issued in connection with Argentina Patent Application No. 20190101378, dated Apr. 19, 2023, 8 pages.
China National Intellectual Property Administration, "Decision of Rejection," issue in connection with Chinese Patent Application No. 202080028183.1, dated Jun. 7, 2023, 23 pages.
Brazilian Office Action, Application No. BR112021020390-7, dated Oct. 31, 2023, 4 pages.

\* cited by examiner

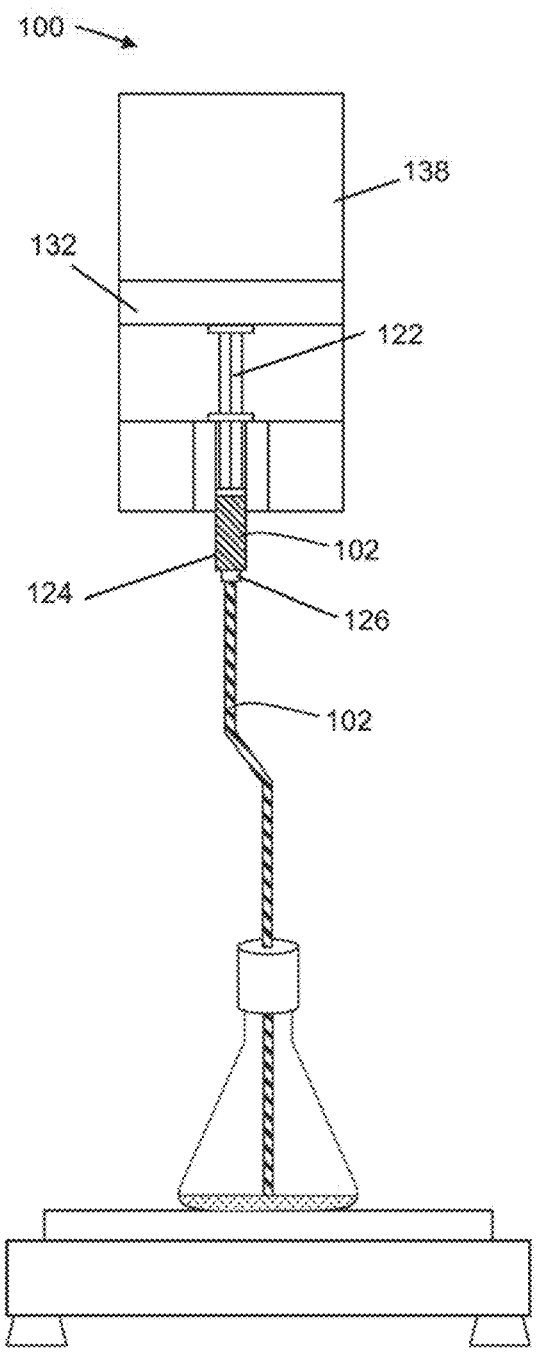
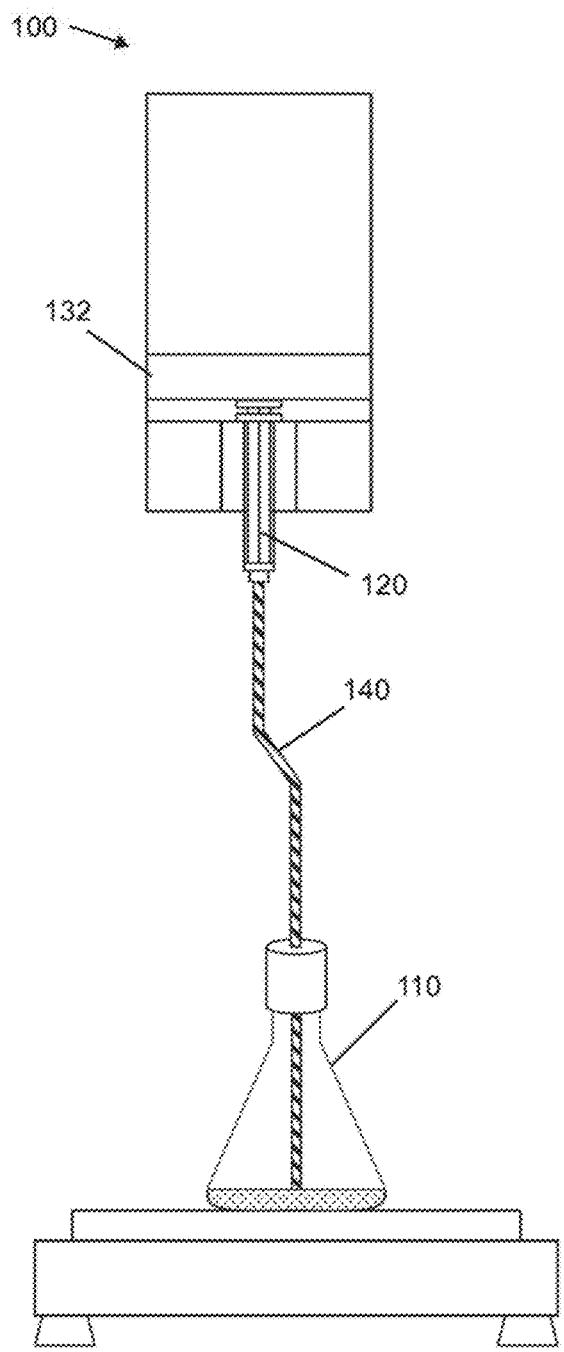
FIG. 2A
FIG. 2B

SYSTEM AND PROCESS FOR CONTINUOUS ADDITION OF CRYOPROTECTANT

CROSS-REFERENCES TO RELATED APPLICATIONS

This application is a non-provisional application and claims benefit of U.S. Patent Application No. 62/835,676, filed Apr. 18, 2019, the specification of which is incorporated herein in their entirety by reference.

BACKGROUND OF THE INVENTION

Field of the Invention

The present invention relates in general to processing and cryopreservation of semen. In particular, the present invention discloses systems and method featuring high-precision and continuous addition of a fluid with agitation to optimize cryopreservation of sperm cells.

Background Art

Cryopreservation of human spermatozoa involves the stabilization of sperm cells at cryogenic temperatures. This technology is commonly utilized in artificial insemination procedures or to preserve male fertility. During a cryopreservation procedure, a cryoprotectant is added to a sperm specimen to protect the sperm from freeze damage. A disadvantage of this procedure is that the uptake of the cryoprotectant imparts stress to the sperm cells, resulting in cell die-off. It is believed that a larger cryoprotectant to sperm cell concentration mismatch only increases this imparted stress. Past known solutions involve a drop-wise addition of cryoprotectant media via droplets breaking away from a suspended dispense tube, or step-wise addition comprising multiple discrete additions spaced minutes apart.

In drop-wise addition, a setup akin to a buret based titration is used. The cryo-protectant media (cryo-media) is added by drop over an extended period of time. In step-wise or bulk addition, the cryo-media is suspended in a vessel above the sperm sample. A stopcock attached to the vessel is used to start/stop flow. There is no deliberate control of the flow rate; instead, a mass balance is used to estimate the volume delivered. The addition of cryo-media is completed within minutes to read the desired total volume added. For example, the cryo-media may be added in three discrete bulk additions spaced 15 minutes apart. These procedures can still result in cell die-off; hence, there exists a need to reduce the rate of cell die off during the addition of a cryoprotectant media to sperm cells.

BRIEF SUMMARY OF THE INVENTION

It is an objective of the present invention to provide systems and methods that can mitigate the detrimental effects of cryopreservation on sperm integrity, as specified in the independent claims. Embodiments of the invention are given in the dependent claims. Embodiments of the present invention can be freely combined with each other if they are not mutually exclusive.

In some aspects, the present invention features an integrated cryopreservation system that can improve survivability and process yield of sperm cells. In an exemplary embodiment, the present invention may feature a dispensing system comprising a vessel, a controlled dispenser, and a dispense tube. The controlled dispenser may be configured to dispense the fluid through the dispense tube and into the vessel. A non-limiting example of the controlled dispenser is a syringe pump comprising a syringe for containing a fluid, such as the cryoprotectant, and a pushing mechanism for displacing the syringe plunger. The syringe pump may be configured to dispense the fluid through the dispense tube and into the vessel upon displacement of the syringe by the pushing mechanism. In some embodiments, the dispense tube has a first end fluidly connected to a discharge port of the controlled dispenser and a second end disposed inside the vessel. In one embodiment, the second end may be contacting a material contained within the vessel. The material contained within the vessel may be cells, such as sperm cells, in a sample medium (i.e. a liquid media that contains e.g. salts, sugars, buffers, proteins, antibiotics, lipids, antioxidants, etc.). In the case of sperm cells, the sperm cells can be sexed (i.e. post-processing) or unsexed (i.e. "conventional"). The system may also be used for other cell types, e.g. cell cultures, oocytes, and embryos. Alternatively, or in conjunction, the second end may be contacting an internal surface of the vessel.

According to some embodiments, the pushing mechanism may comprise a moveable pusher block, a motor operatively coupled to said pusher block, and a motor controller for controlling the motor. The pusher block and syringe may be arranged on a track and aligned such that the pusher block can press against a plunger of the syringe. The motor is configured to move the pusher block along the track in a direction that pushes the plunger into a barrel of the syringe, thereby displacing the syringe. Displacement of the syringe ejects the fluid contained in the barrel through the discharge port and into the dispense tube. The fluid exits the dispense tube through the second end and into the vessel.

In other aspects, the dispensing system may further comprise a mixer for mixing the contents in the vessel. In further embodiments, the dispensing system may further comprise one or more additional controlled dispensers, and a dispense tube fluidly connecting each controlled dispenser to the vessel. The additional dispensers can dispense the same or different fluids, such as cryoprotectants or gases, through their respective dispense tubes and into the vessel upon displacement by the pushing mechanisms.

In one embodiment, the controlled dispenser can continuously dispense the fluid. In a non-limiting example, the pushing mechanism may displace the syringe plunger such that the fluid is dispensed continuously from the second end of the dispense tube that is submerged in the sperm cells. In another embodiment, the controlled dispenser can continuously dispense the fluid such that droplet formation is prevented and the fluid is dispensed without being dripped into the vessel. In yet other embodiments, the controlled dispenser can dispense the fluid into the vessel at a flow rate that is less than or equal to a maximum flow rate, $f_{max}$, determined by the equation: $f_{max}$ (ml/min)=0.0045*V, where V=volume of material in ml. In alternative embodiments, (for example, embodiments with a shorter dispense time of around 45 minutes) the maximum flow rate, $f_{max}$, may be determined by the equation: $f_{max}$ (ml/min)=0.0056*V, where V=volume of material in ml. The maximum flow rate is dictated by the volume of cryoprotectant (which is in turn dictated by the measured amount of sample), which is added over a set amount of time. Typically, the addition time is about 60 minutes, but in some instances may be about 45 minutes. For larger samples, the volume of cryoprotectant needed will be larger, and thus the maximum flow rate will be larger. Thus, the addition time may be roughly constant, regardless of the sample size and the volume of cryoprotectant added, because the total flow rate may be scaled linearly with the volume.

According to other embodiments, the cryopreservation system of the present invention may be utilized in a method for preparing the biological specimens for cryopreservation. When implementing the syringe pump as the controlled dispenser, the method may comprise adding the cryoprotectant into the syringe, adding the biological specimen into a vessel, connecting the syringe to the vessel via a dispense tube, and displacing the syringe to dispense the cryoprotectant into the vessel at a desired flow rate, thereby adding the cryoprotectant to the biological specimen. In one embodiment, one end of the dispense tube may be contacting the biological specimen or an internal surface of the vessel. In some embodiments, the cryoprotectant is continuously dispensed into the vessel. In a preferred embodiment, the syringe is displaced such that droplet formation is prevented and the cryoprotectant is dispensed without being dripped into the vessel. In other embodiments, the cryoprotectant is dispensed into the vessel at a flow rate that is less than or equal to the maximum flow rate, $f_{max}$, determined by the previous equation.

One of the unique and technical features of the present invention is the continuous addition of the cryoprotectant to the specimen as compared to bulk or drop-wise addition. The same volume of cryoprotectant media, such as a glycerol-based cryoprotectant, can be added at a slow and continuous rate over a specified period of time. Another technical feature of the invention is the dispense tube submerged or contacting an internal surface of the vessel to enable low or soft impact addition of the cryoprotectant to the sperm cell solution. This feature can allow for gradual introduction of the cryoprotectant into the sperm cell solution in a manner that reduces cell stress. Yet another technical feature of the invention is the dilute addition of cryoprotectant in which the cryoprotectant enters the sperm cell fluid at a relatively low volume to reduce cytotoxity to local cells at or near the entry point. Without wishing to be limited by a particular theory or mechanism, it is believed that these technical features can reduce process risks and the rate of cell die off, thereby improving survivability and process yield of sperm cells. None of the presently known prior references or work has the unique inventive technical feature of the present invention.

In addition, the inventive technical feature of the present invention contributed to a surprising result. After extensive experimentation, it was unexpectedly found that through the cryopreservation preparation process, the survivability of cells increased by an average of 5% when using the submerged, continuous addition process in comparison to the step-wise addition process of three bulk additions spaced 15 minutes apart). The ratio of specimen volume to dispensed cryoprotectant volume was the same in both procedures. Furthermore, it was surprisingly found that cells prepared using the cryopreservation preparation process of the present invention had an 8% increase in survivability through the freeze/thaw procedure. Thus, the present invention was surprisingly able to increase the process yield of sperm cells, an outcome that one of ordinary skill in the art cannot simply predict or envision.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWING(S)

The patent application or application file contains at least one drawing executed in color. Copies of this patent or patent application publication with color drawing(s) will be provided by the Office upon request and payment of the necessary fee The features and advantages of the present invention will become apparent from a consideration of the following detailed description presented in connection with the accompanying drawings in which:

FIGS. 2A-2B show a non-limiting example of a controlled dispenser of the dispensing system. FIG. 2A depicts a partially displaced syringe pump and FIG. 2B depicts the syringe pump in a completely displaced position.

DETAILED DESCRIPTION OF THE INVENTION

Figure 1:
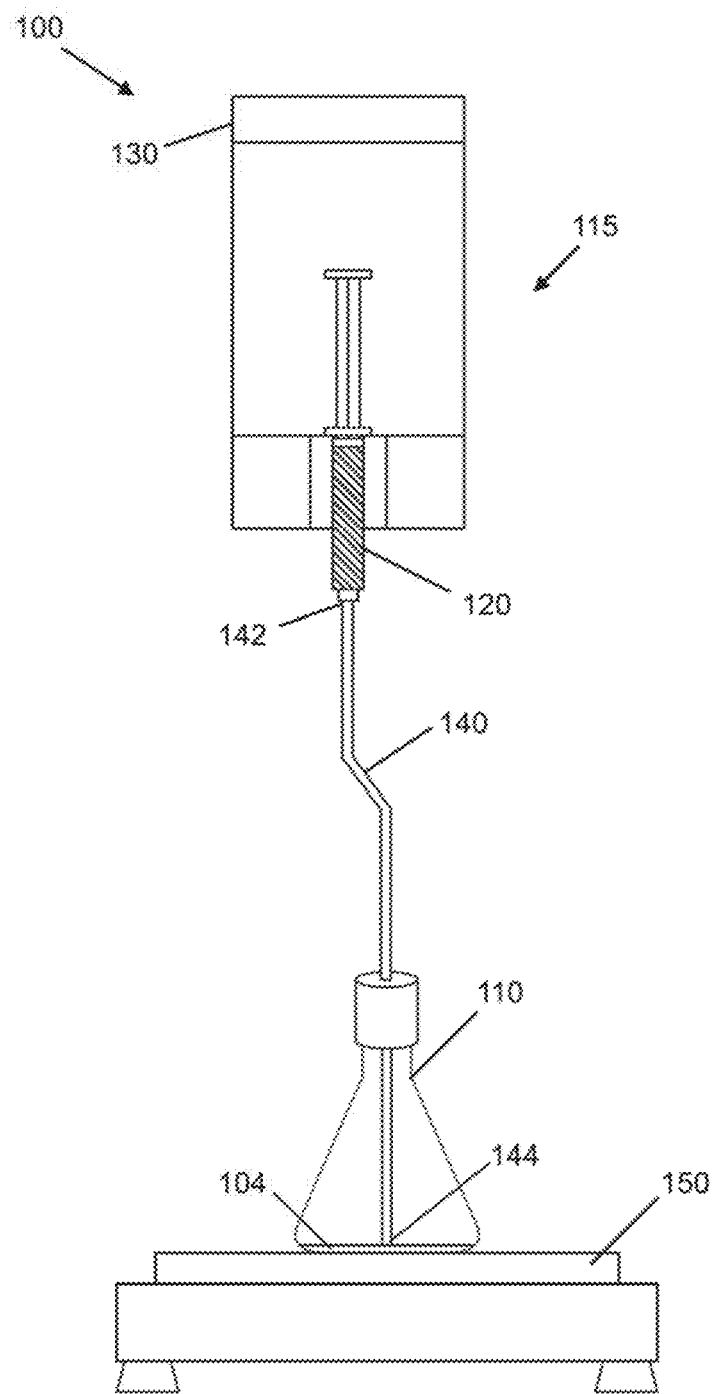
FIG. 1 shows a non-limiting embodiment of a dispensing or cryopreservation system of the present invention.

Following is a list of elements corresponding to a particular element referred to herein:
100 system
102 fluid or cryoprotectant
104 biological specimen
110 vessel
112 internal surface of the vessel
115 controlled dispenser, for example, a syringe pump
120 syringe
122 plunger
124 barrel
126 discharge port
127 syringe clamp
129 position sensor
130 pushing mechanism
132 pusher block
134 motor
136 motor controller
138 track
140 dispense tube
142 first end of dispense tube
144 second end of dispense tube 150 mixer As used herein, a "cryoprotectant" refers to a chemical substance that is added to a biological specimen in order to protect said specimen from freeze damage during cryopreservation. The term "cryoprotectant" may be used interchangeably with the terms "cryoprotectant media" or "cryomedia". Examples of cryoprotectants include, but are not limited to, glycerol, ethylene glycol, dimethyl sulphoxide (DMSO), sucrose, trehalose, dextrose, fructose, tris(hydroxymethyl)aminomethane (TRIS), TRIS B, Tris-Fructose-Egg yolk-Glycerol (TFEG), citric acid, and 1,2-propanediol.

As used herein, the "controlled dispenser" refers to any device capable of delivering a fluid, such as cryoprotectant or gas, at a controlled flow rate. In some preferred embodiments, the dispenser is automated. In other embodiments, the dispenser may be non-automated. Non-limiting examples of controlled dispensers that may be used in accordance with the present invention include a syringe pump, mechanical pump, peristaltic pump, gravity pump, direct lift pump, microfluidic pump, centrifugal pump, compressor, gas regulator, or any positive-displacement pump. In some preferred embodiments, the dispenser may be any flow controller that can deliver fluid with similar accuracy as a syringe pump. In another example, the controlled dispenser may comprise a vessel that has with it a controlled pressure above the fluid and a downstream flow rate measurement. A simple feedback loop controls pressure based on flow rate error to a set point. Alternatively, a throttling valve may be implemented to control flow instead of controlling pressure on the fluid.

As used herein, the term "syringe" refers to a positive-displacement pump comprising a barrel and a moveable, e.g. slidable, plunger that can be inserted into the barrel. The plunger can include a seal that allows for the plunger to create a suction when the plunger is pulled away from the barrel, thereby drawing and trapping fluids in the barrel. Pushing the plunger into the barrel forces, e.g. discharges, the trapped fluids from the barrel. As used herein, the term "displace" and derivatives thereof when used in conjunction with syringe refer to the plunger being pushed into the barrel.

Figure 3:
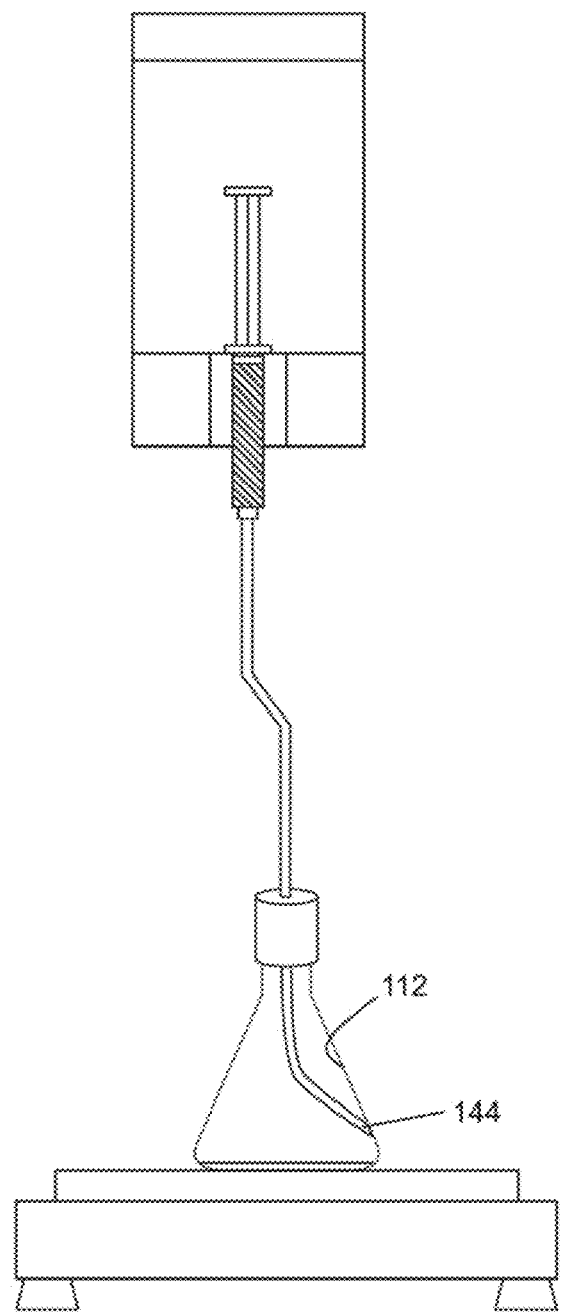
FIG. 3 shows another non-limiting embodiment of the cryopreservation system.

Referring now to FIG. 1, in one embodiment, the present invention features a dispensing system (100) comprising a vessel (110), a controlled dispenser (115), and a dispense tube. In some embodiments, the dispense tube (140) has a first end (142) fluidly connected to a discharge port (126) of the controlled dispenser and a second end (144) disposed inside the vessel (110). In one embodiment, the second end (144) may be contacting a material (104) contained within the vessel. In another embodiment, the second end (144) may be contacting an internal surface (112) of the vessel as shown in FIG. 3. Hereinafter, the controlled dispenser may be be exemplified by a syringe pump; however, it is to be understood that the controlled dispenser is not limited to a syringe pump and that it can be any device suited for delivering a fluid and controlling a flow rate thereof. In some embodiments, the syringe pump (115) may comprise a syringe (120) for containing a fluid (102) and a pushing mechanism (130) for displacing said syringe (120). The syringe pump (115) may be configured to dispense the fluid through the dispense tube (140) and into the vessel (110) upon displacement of the syringe (120) by the pushing mechanism (130).

According to some embodiments, the dispensing system (100) of the present invention may be utilized in cryopreservation procedure. For example, in one embodiment, the invention features a cryopreservation system (100) for dispensing a cryoprotectant (102) to a biological specimen (104). In some embodiments, the cryoprotectant (102) may comprise glycerol, ethylene glycol, dimethyl sulphoxide (DMSO), 1,2-propanediol, or any other suitable substance that can prevent damage to a biological specimen during freezing.

In one embodiment, the biological specimen (104) may comprise sperm cells. The sperm cells may comprise sex-sorted or gendered-skewed cells in which they predominantly contain an X-chromosome or a Y-chromosome. For example, the sperm cells may be sex-sorted to predominantly contain the X-chromosome so as to increase the likelihood that after insemination, the resulting fetus is a female. In another embodiment, the sperm cells may be unsorted. In other embodiments, the present invention is not limited to just sperm cells. Other types of specimens may be cryopreserved in accordance with the present invention. For example, the biological specimen may comprise tissues, stem cells, bone marrow, embryos, ova, oocytes, egg cells, amniotic fluid and umbilical cord, hepatocytes, blood cells, neuronal cells, organs, teeth, plant seeds, and microorganisms.

In one embodiment, the cryopreservation system (100) may comprise a vessel (110) for containing the biological specimen (104), a syringe pump (115) comprising a syringe (120) for containing the cryoprotectant (102) and a pushing mechanism (130) for displacing said syringe (120), and a dispense tube (140) having a first end (142) fluidly connected to a discharge port (126) of the syringe and a second end (144) disposed inside the vessel (110). The syringe pump (115) can dispense the cryoprotectant (102) through the dispense tube (140) and into the vessel (110) upon displacement of the syringe (120) by the pushing mechanism (130).

In some embodiments, the second end (144) may be in contact with an internal surface (112) of the vessel. For example, the second end (144) may be directly touching or positioned adjacent to the internal surface (112) of the vessel. In other embodiments, the second end (144) may be in contact with the biological specimen (104) when it is contained in the vessel (110). For instance, the second end (144) of the tube may be submerged in the biological specimen (104). In a preferred embodiment, the dispensed cryoprotectant (102) is prevented from being dripped into the vessel (110) by contacting the second end (144) of the tube with the biological specimen (104) or the internal surface (112) of the vessel. As used herein, the term "drip" and derivatives thereof refer to droplets breaking away from a suspended dispense tube.

Figure 4A:
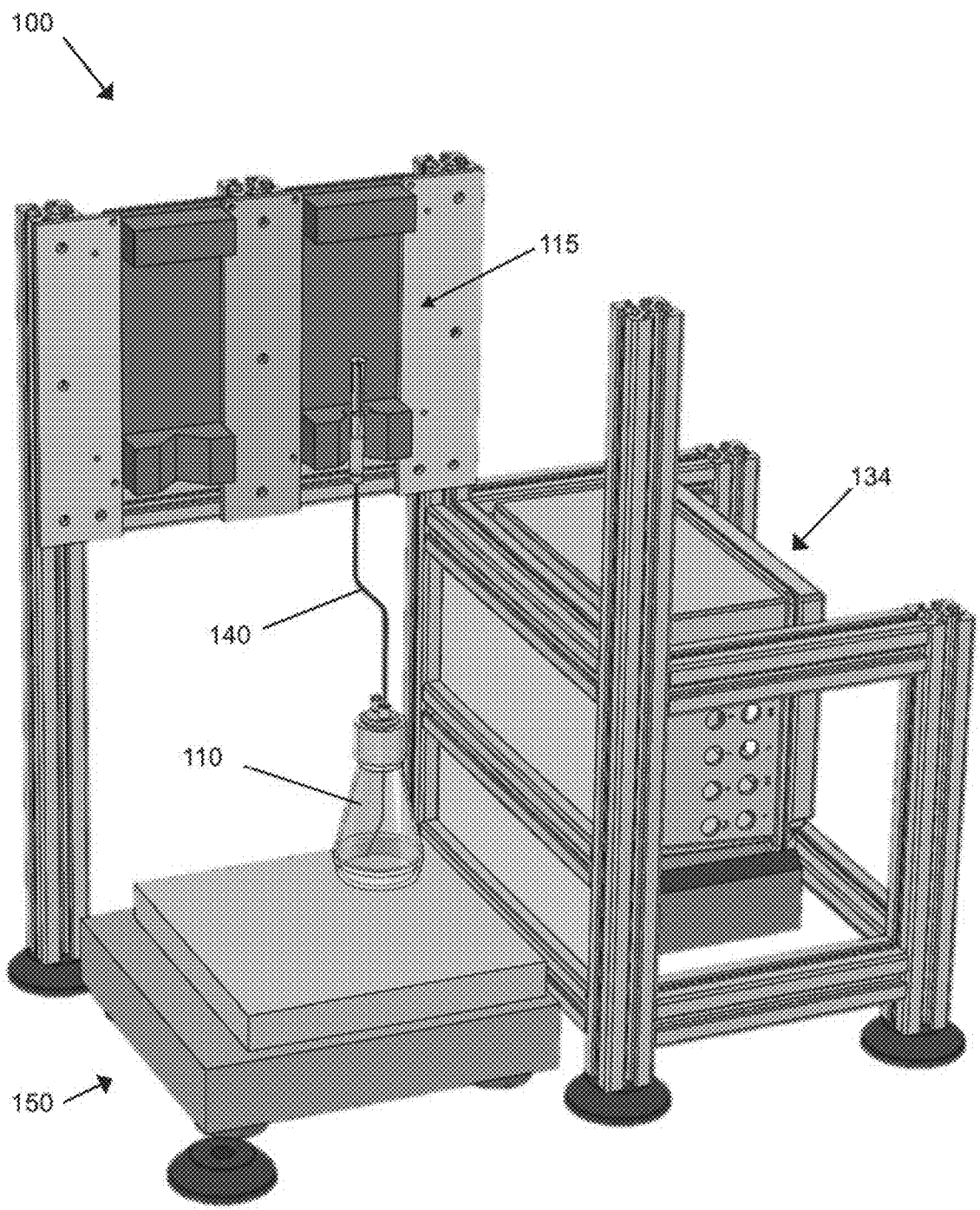
FIG. 4A is another non-limiting embodiment of the cryopreservation system.

In one embodiment, the internal surface (112) of the vessel can include an internal side surface or internal bottom surface of the vessel. In some embodiments, the vessel (110) may be a flask, a tube, or any container having sufficient volumetric capacity to hold the cryoprotectant (102) and biological specimen (104). For example, the vessel (110) may have a volumetric capacity ranging from about 20 ml to about 100 ml. In another embodiment, the capacity of the vessel (110) may range about 100 ml to about 250 ml or about 250 ml to about 500 ml. In yet another embodiment, the capacity of the vessel (110) may be greater than 500 ml. In other embodiments, the vessel (110) may be an enclosed or sealed container. As shown in FIG. 4A, the vessel can include a cap that has an input port for receiving the dispense tube (140), thus the cap allows for the vessel to be sealed while still providing access to the interior of the vessel. In some embodiments, the vessel (110) may be constructed from a rigid or semi-rigid material, such as glass or plastic.

In further embodiments, the material may be opaque if the specimen is light sensitive, or substantially transparent for visibility into the vessel.

In one embodiment, if the second end (144) of the dispense tube is in contact with the biological specimen (104), the cryoprotectant (102) is directly added to the biological specimen (104). For instance, the second end (144) is submerged in the biological specimen (104) and cryoprotectant (102) as the cryoprotectant (102) is added into the vessel. In another embodiment, if the second end (144) of the dispense tube is in contact with an internal surface of the vessel but not in contact with the biological specimen (104), e.g. the vessel side wall, the cryoprotectant (102) may be added to the biological specimen (104) indirectly. As shown in FIG. 3, if the second end (144) is touching the vessel side wall, the cryoprotectant (102) flows along the vessel side wall as it is gradually added to the specimen. In either embodiment, droplet formation is broken up and the dispensed cryoprotectant (102) does not drip into the vessel (110).

Without wishing to limit the present invention to a particular mechanism, the syringe pump can control the rate of delivery of the cryoprotectant by precise displacement of the syringe plunger. In one embodiment, the addition rate is set programmatically as a function of the volume of cells. Since the batch size of sperm cells can vary greatly based on the number of cells received from an ejaculate, a wide range of addition volumes must be satisfied. In some embodiments, the volume of sperm cell fluid may range from about 1 ml to about 100 mL per semen sample. In preferred embodiments, the total volume cryo-media added may be about 10% to about 25% of the sperm cell sample volume. For example, a 25 ml semen sample may require about 20% of cryo-media, thus the cryo-media volume is about 5 ml.

In some embodiments, the total cryo-media addition spans about 60 minutes for each batch. In other embodiments, the addition time may range from about 45 to 90 minutes. Since the total cryo-media volume changes as a function of the volume of sperm cell fluid, the flow rate is set based on target volume divided by the addition time. In one embodiment, the flow rate of the dispensed fluid, also referred to as addition rate, may range from about 0.01 ml/min to about 1 ml/min. For example, the flow rate may be 0.017-0.333 mL/min. In another embodiment, the flow rate may be about 0.01 ml/min to about 0.05 ml/min or about 0.05 ml/min to about 0.1 ml/min. In a further embodiment, the flow rate may be about 0.1 ml/min to about 1 ml/min or greater than 1 ml/min. Continuing with the previous example, 5 ml of cryo-media may be continuously added to the 25 ml semen sample in a span of about 60 minutes, thus the cryo-media flow rate is about 0.083 ml/min.

As shown in FIGS. 2A-2B, the pushing mechanism (130) may comprise a moveable pusher block (132) disposed on a track (138). The pusher block (132) and syringe (120) may be arranged on the track (138) such that the pusher block (132) is aligned with the syringe (120). The pusher block (132) can move along the track (138) to press against the plunger (122) of the syringe. Referring to FIG. 5A-7, the pushing mechanism (130) further includes a motor (134) operatively coupled to the pusher block (132), and a motor controller (136) for controlling the motor (134). The motor (134) may be configured to move the pusher block (132) along the track (138) in a direction that pushes the plunger (122) into the barrel (124) of the syringe, thereby displacing the syringe (120) to eject the fluid (102), such as the cryoprotectant, contained in the barrel (124) through the discharge port (126) and into the dispense tube (102). The fluid (102) then exits the dispense tube (140) through the second end (144) and into the vessel.

Figure 7:
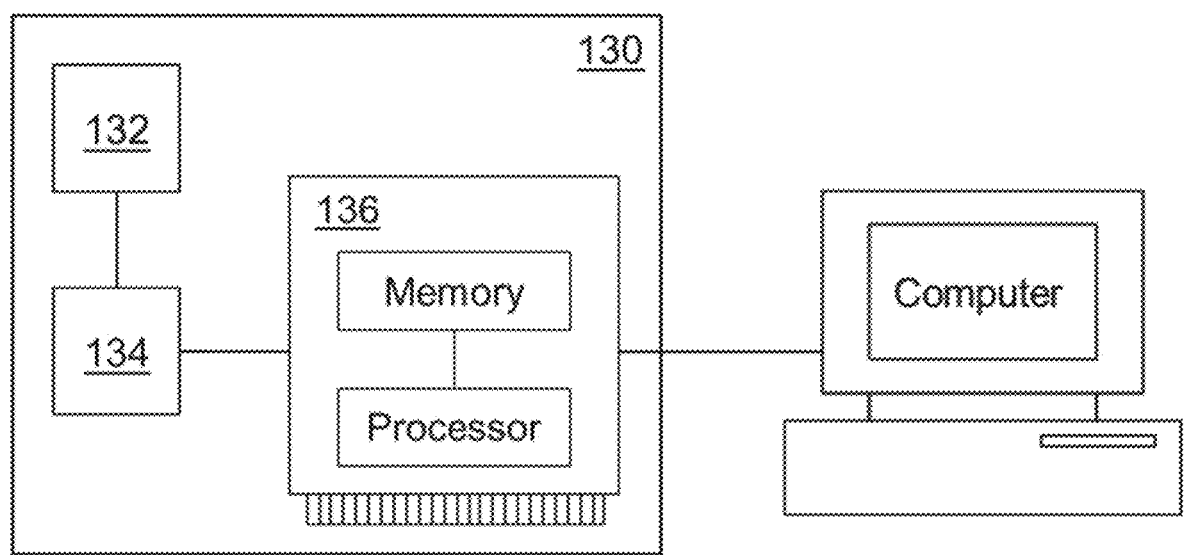
FIG. 7 is a non-limiting schematic of a pumping mechanism of the invention.

As shown in FIG. 7, in some embodiments, an external processor, such as a computer, is used to control the entire system. The computer can execute a LabVIEW software to operate the system. For instance, upon receiving a user-input which can be entered via peripheral devices such as a mouse or keyboard, the computer transmits signals to the motor controller, which may be integrated into the syringe pump. In one embodiment, the motor controller (136) may comprise a processor and a memory operatively coupled to the processor. The memory can store a set of instructions that, when executed by the processor upon receiving the computer signals, causes the motor (134) to move the pusher block (132) along the track at a desired step size in the direction to displace the syringe (120). Thus, the cryoprotectant (102) is added to the biological specimen (104) at a desired flow rate.

Figure 9:
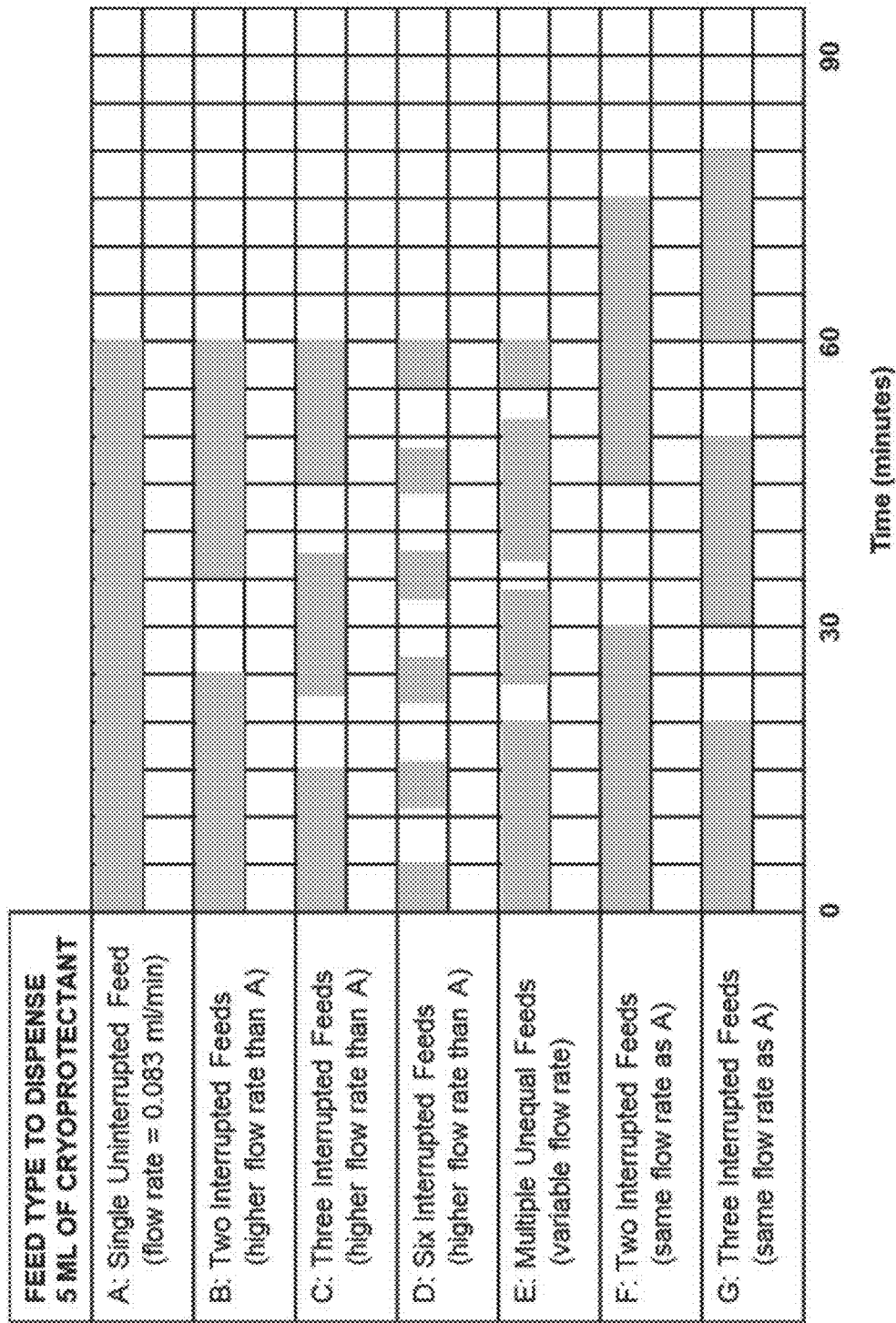
FIG. 9 shows non-limiting examples of feed streams for dispensing the cryoprotectant.

In some embodiments, a continuous flow may refer to a smooth or non-discrete flow, a steady flow or an uninterrupted flow. In one embodiment, the pusher block (132) displaces the syringe (120) such that the cryoprotectant (102) is added to the biological specimen (104) at a continuous flow rate. For example, the motor moves the pusher block (132) at a specific step size such that the cryo-media flow rate is about 0.083 ml/min to continuously dispense 5 ml of cryo-media into a 25 ml semen sample in about 60 minutes as shown in FIG. 9, Feed A.

In other embodiments, the pusher block (132) can displace the syringe (120) such that the cryoprotectant (102) is added to the biological specimen (104) at a pulsed flow rate or an interrupted flow rate. A pulsed or interrupted flow rate refers to a flow rate in which there are discrete breaks in the flow; however, the flow is not drop wise. For example, 25% of the cryo-media volume is slowly and continuously added to the specimen in a span of 10 minutes, then paused for 5 minutes, and then repeated until the total volume of cryo-media is dispensed. As another example, 10% of the cryo-media volume is slowly and continuously added to the specimen in a span of 3-4 minutes, then paused for 2-3 minutes, and then repeated until the total volume of cryo-media is dispensed. Various non-limiting examples of pulsed or interrupted flow are shown in FIG. 9, Feeds B-G. In some embodiments, the pulsed flow rate may be a steady or constant flow rate, such as in Feeds B-D and F-G. Alternatively, the cryoprotectant may be fed at a varying pulsed flow rate, e.g. non-constant flow rate, over the course of the stream as illustrated in Feed E. In preferred embodiments, the cryoprotectant is dispensed in a manner and/or flow rate that inhibits droplet formation.

In one embodiment, the accuracy in the addition may be a function of the syringe inside bore diameter, if the linear step size of the syringe pump is fixed. To achieve the same accuracy across a range of addition volumes, by percentage of delivered volume to target volume, multiple sized syringes can be used. In some embodiments, the control software specifies the size of syringe based on the volume of sperm cells. If the wrong syringe is placed on the system, the amount of cryoprotectant media delivered could be significantly greater or less than specified. This error amounts to significant loss of cells through either initial cell die off in this process (over-delivery) or increased die off measured after thawing of cryopreserved cells (under-delivery). This risk is mitigated by implementing an inductive position sensor (128) to determine an outside diameter of the syringe placed on the system. As shown in FIGS. 5A-6B, the inductive position sensor (128) may be connected to a syringe clamp (127). When the syringe clamp is holding the syringe, the sensor is displaced and this change in the position of the sensor is proportional to a change in voltage, which correlates to the outer diameter of the syringe.

In preferred embodiments, the syringe used in accordance with the present invention should be biocompatible with the specimen. The syringe should be free off lubricants or other substance that could be detrimental to sperm cells. A non-limiting example of a syringe that is suitable for use with the present invention is a NORM-JECT luer lock syringe. In some embodiments, the volumetric capacity of the syringe may range from about 2 ml to about 50 ml. In one embodiment, the volumetric capacity of the syringe may be about 2 ml to about 5 ml. In another embodiment, the volumetric capacity of the syringe may be about 5 ml to about 20 ml. In yet another embodiment, the volumetric capacity of the syringe may be about 20 ml to about 50 ml. In further embodiments, the volumetric capacity of the syringe may be greater than 50 ml.

In other embodiments, the dispense tube may be constructed from a plastic, rubber, or silicone material. For example, the dispense tube may be made of PVC, DEHP-Free PVC, Tygon®, C-flex®, high density polyethylene, platinum cured silicone, or peroxide cured silicone. Moreover, the tubing material may be medical grade quality. In one embodiment, the dispense tube may be constructed of PEEK with 1/16" OD, 0.020" ID. An inner diameter of the tube can vary in size, ranging from about 0.01" to about 0.1". For example, the inner diameter may be 0.020". The dispense tube can be a predetermined length or alternatively cut to a required length to sufficiently span the distance between the syringe and vessel. In some embodiments, the tubing material may be opaque. Alternatively, the tubing material may be substantially transparent to allow for visibility into the tube, for instance, to visualize any blockage in the tube. In other embodiments, the dispense tube may be flexible, semi-rigid, or rigid. Tubing expansion under pressure may increase error to the target delivery volume. To ensure accuracy, the tube can have a high OD/ID ratio with a rigid material, thereby reducing the risk of tubing expansion.

In the prior arts, a suspended vessel with a stopcock or a buret for addition has physical limitations that prohibits submersion of the dispense tip. For instance, the typical opening size of the vessel or the size of buret tip limits the ability to submerge the tip. In addition, by using a buret, which is typically made of brittle glass, physical contact with a vessel wall would place a bending force on the glass putting it at risk for fracture. Radial agitation of the vessel would only increase the fracture risk. In contrast, the dispense tube of the present invention allows for submersion of the dispense tip as well as agitation of the vessel.

Once sperm cells are packaged for sale, each lot is tested for bacteria. If bacteria levels are above a threshold, the batch is not sold as it could introduce a health risk. Furthermore, prevention of cell cross-contamination between batches is paramount. Thus, there is a need to prevent the cryo-media from becoming contaminated with bacteria and/or other cells. The present invention addresses these concerns by using a reusable or disposable fluid path. Without wishing to be limited to a particular theory or mechanism, the entire fluid path can eliminate contamination risks from bacteria and cross-contamination between different specimens, e.g. bull-bull.

In some embodiments, the dispense tubing and vessel may be reused through a cleaning and autoclave process. In other embodiments, the syringe may be discarded after use. In preferred embodiments, the dispense tubing is submerged into the fluid containing the sperm cells. By submerging the end of the dispense tubing instead of suspending it, the addition rate is governed by the syringe pump rather than the adhesion forces of suspending a droplet from the end of the dispense tubing.

In further embodiments, the system (100) may also include a mixer (150) for mixing the cryoprotectant (102) and the biological specimen (104) contained in the vessel (110). Without wishing to limit the present invention, the mixer (150) can prevent the biological specimen (104) from adhering to the internal surface (112) of the vessel. In one embodiment, the mixer (150) may be a shaker table. As an example, the shaker table may comprise a stationary base and a moveable platform that can support the vessel. As shown in FIG. 4A, the vessel (110) may be placed on the shaker table, which provides agitation to the fluid in the vessel, thereby mixing the cryoprotectant media into the fluid containing the sperm cells and reducing the local concentration at the end of the dispense tubing. The agitation rate of the shaker table may be programmatically set by rotational speed if the rotation radius is fixed by the equipment. While the shaker table can reduce contamination by eliminating contact with the contents of the vessel, other types of mixer equipment may be used with the system, such as a magnetic stir bar with stir plate or an overhead stirrer with an impeller, paddle, or blade. However, since there is a need to minimize shear forces on the sperm cells, which may be physically destroyed by a submerged rotating object, acoustic mixing may be implemented in accordance with the present invention. For example, acoustic mixing may involve sonication, which is agitation using sound energy.

Figure 4B:
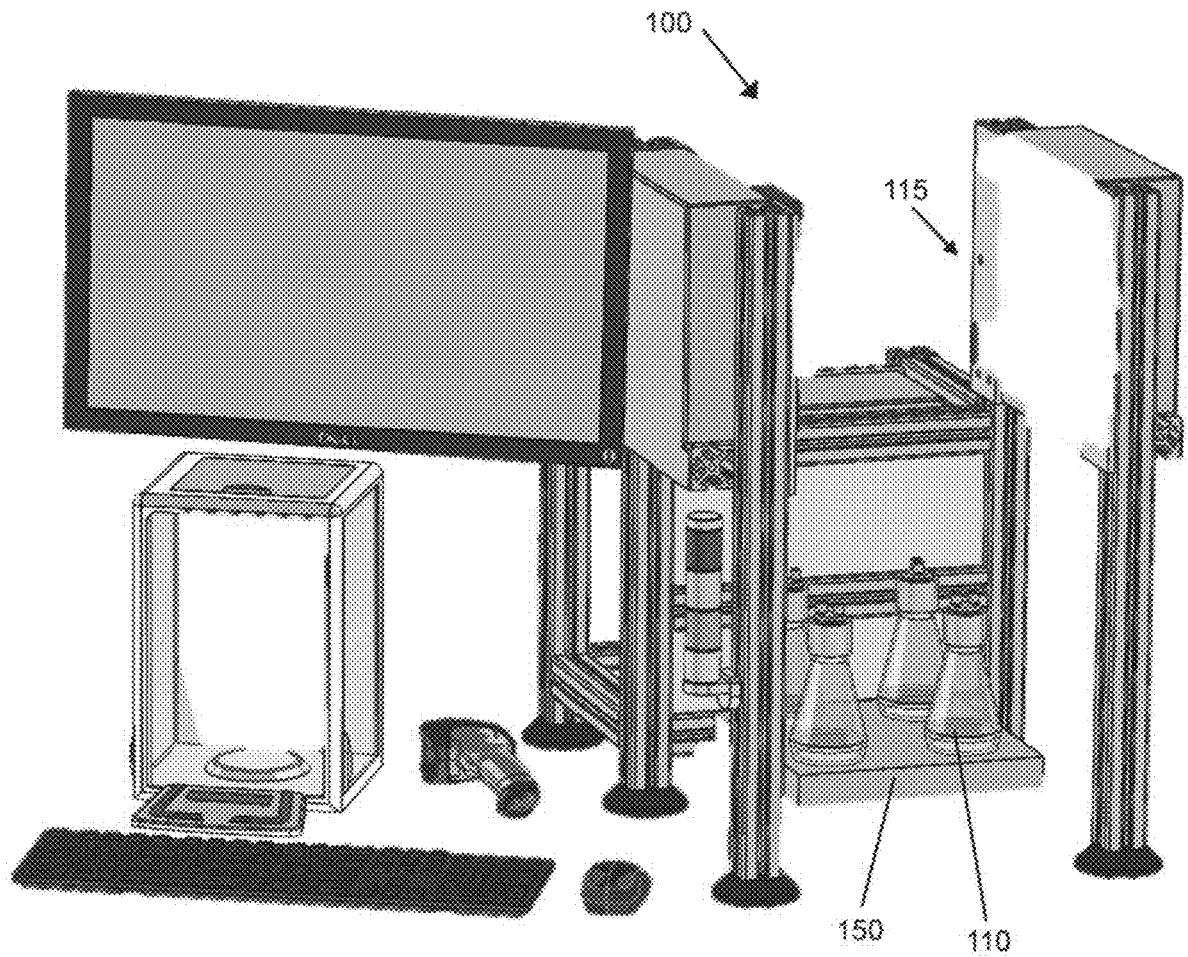
FIG. 4B shows an embodiment where multiple specimens can be processed simultaneously.
Figure 5A:
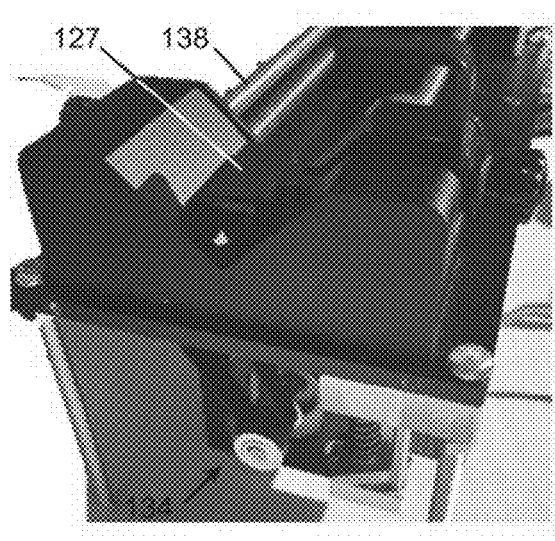
FIG. 5A shows an initial position of a syringe clamp.
Figure 5B:
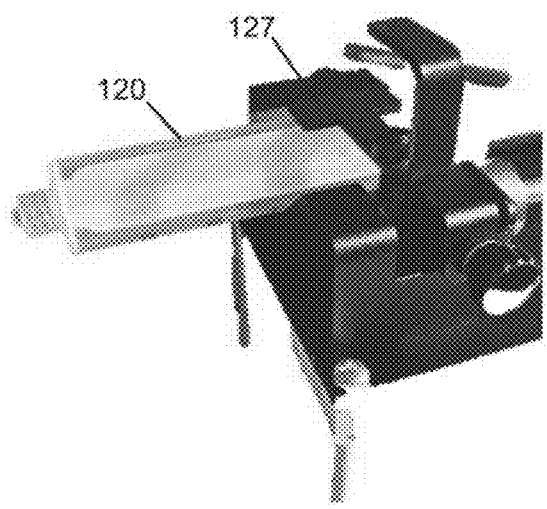
FIG. 5B shows a displaced position of the syringe clamp holding a syringe.
Figure 6A:
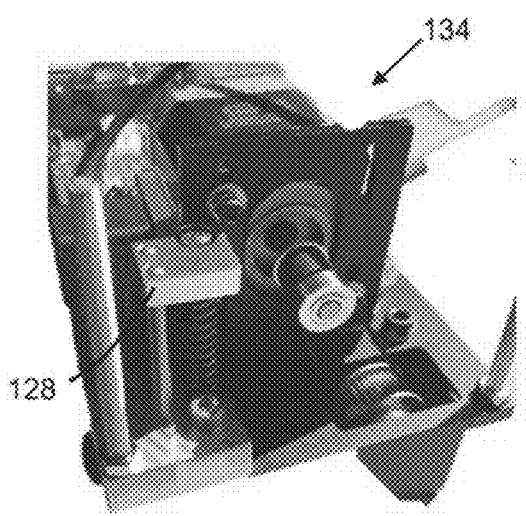
FIG. 6A shows an initial position of an inductive position sensor that is connected to the syringe clamp; a change in position is proportional to a change in voltage.
Figure 6B:
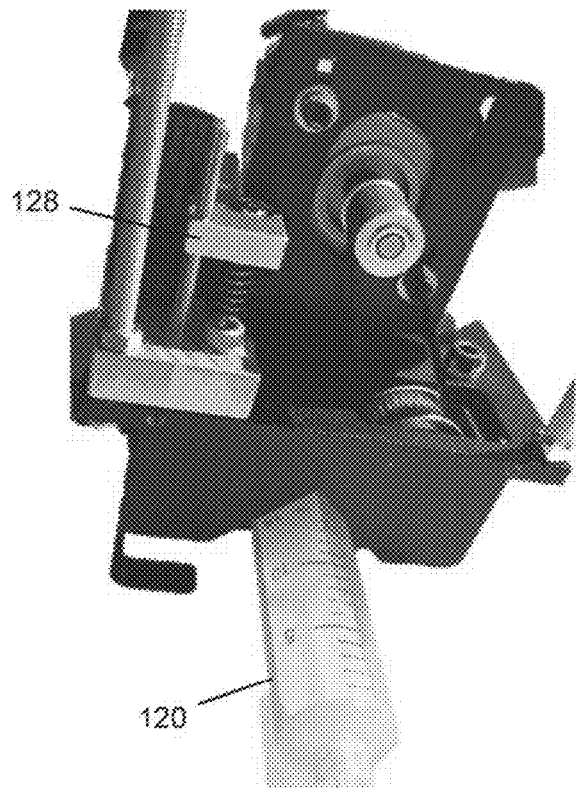
FIG. 6B shows a displaced position of the sensor when the syringe clamp is holding the syringe.

As shown in FIG. 4B, in some embodiments, the dispense system (100) may be a multiple dispense system implementing a plurality of controlled dispensers and vessels to process multiple specimens simultaneously. In some embodiments, each vessel may contain its own specimen, which can be the same as or different from the specimens in the other vessels. Each vessel may be coupled to its own controlled dispenser, such as a syringe pump for example, to dispense its own a fluid. The fluid in each dispenser may be the same as or different from the fluid in the other dispensers. For example, one dispense system may be used to dispense glycerol into a semen sample and a second dispense system may be used to dispense glycerol into another semen sample of the same or different origin. As another example, one dispense system may be used to dispense glycerol into a tissue sample while a second dispense system may be used to dispense glycerol into a semen sample. In another embodiment, one dispense system may be used to dispense glycerol into an embryo specimen while a second dispense system may be used to dispense DMSO into a semen sample. The vessels can be placed on a single shaker table provided that the shaker table is capable of supporting and mixing a plurality of vessels. Alternatively, each vessel may have its own mixer.

In other embodiments, the multiple dispense system may implement a plurality of controlled dispensers, such as syringe pumps, fluidly coupled to a single vessel. This may allow for a shorter processing time by dispensing the cryoprotectant fluid from multiple dispensers. Alternatively, the dispensers can dispense various fluids, such as cryoprotectants or gases, into the single vessel simultaneously or sequentially. For instance, the dispense system may include multiple syringe pumps that dispense various fluids into a single vessel for vitrification of sperm cells. Each of the fluids can be dispensed at their own independent flow rates and timing. In one embodiment, the dispense system may include a syringe pump that dispenses a cryoprotectant and a second controlled dispenser that dispenses gas into a single vessel. Each of the fluids can be dispensed at their own independent flow rates and timing. In one example, the multiple dispense system may be configured to dispense two or more different medias that are added to the cells such that delivery is defined similar to a recipe. The flow rates of each media may be varied independently and/or the delivery between the medias may be coordinated, such as ramping the flow rate.

In some embodiments, the vessel may be equipped with a cap that can create an air-tight seal such that a gas can be added and contained within the vessel. The cap may include a port for receiving the gas, as well as other ports for receiving liquids. As an example, preparation of a specimen for in-vitro fertilization may require lower oxygen concentrations and/or some type of gas coverage in the vessel to improve survivability. In one embodiment, the vessel may be sealed and purged with argon, $CO_2$ and/or nitrogen, which may be added via one or more ports, each coupled to its own pump or gas regulator. A separate exit port may be used to maintain atmospheric conditions and prevent pressure build-up in the vessel. In another embodiment, the process may operate under reduced pressure by coupling a port to a vacuum pump. In some embodiments, the cryo-media can be added with the gas via a separate input port and pump. In conjunction with or alternative to the syringe pumps, other types of pumps, such as a microfluidic pump, centrifugal pump, compressor, gas regulator, or another kind of positive-displacement pump, may be used in accordance with the present invention to dispense the cryo-media, gases, or other fluids.

According to some embodiments, the dispense systems of the present invention may implement a temperature ramp during the cryopreservation process. When preparing the biological specimen for cryopreservation, the specimen and cryoprotectant are preferably in a temperature controlled environment. In a preferred embodiment, the specimen and cryoprotectant are maintained at a temperature of about 5° C. Any deviation in temperature should not exceed ±2° C. For example, the temperature deviation may be ±1° C. In some embodiments, the entire system may be located in a temperature controlled room. If a dedicated cold room is not available, at least the syringe pump and vessel may be contained in a temperature controlled chamber, such as a cold box, so as to maintain constant temperature of the specimen and cryoprotectant. In another embodiment, the vessel and/or syringe may be jacketed with a heating/cooling device. Temperature feedback may be implemented via a thermocouple or thermistor, which can be submerged in the specimen solution or attached to the vessel.

Figure 8A:
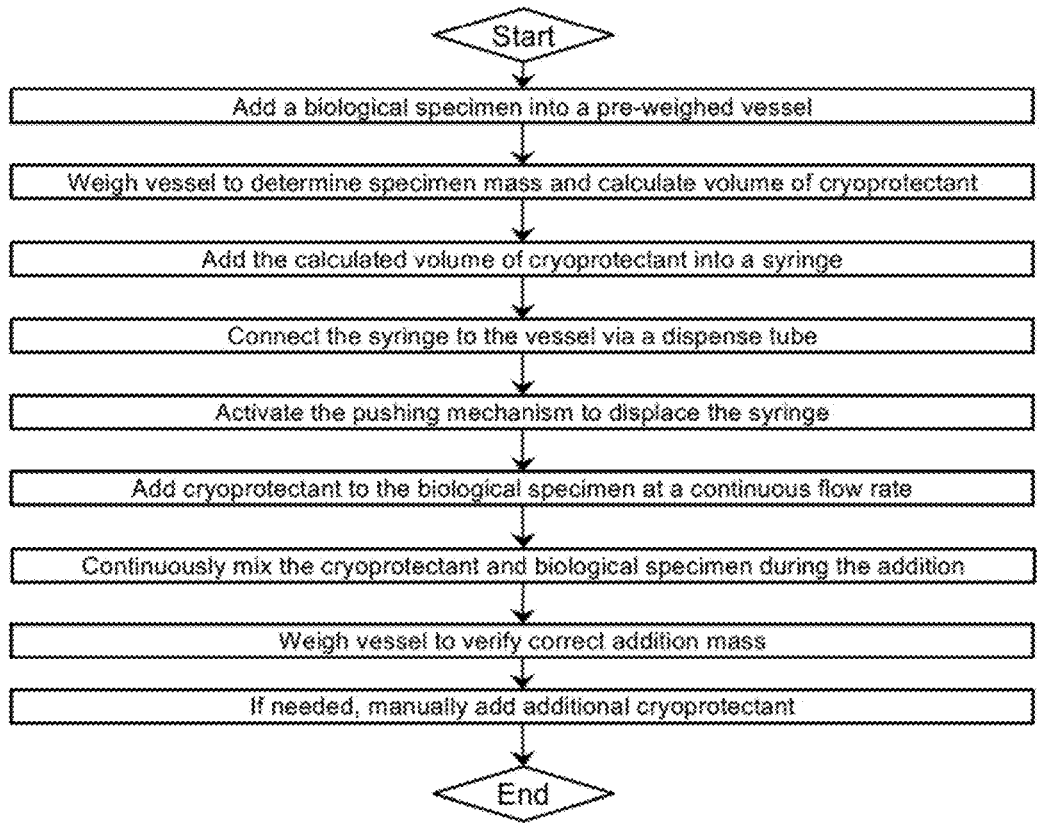
FIGS. 8A-8C are non-limiting examples of process flow diagrams for dispensing a cryoprotectant according to the present invention.
Figure 8B:
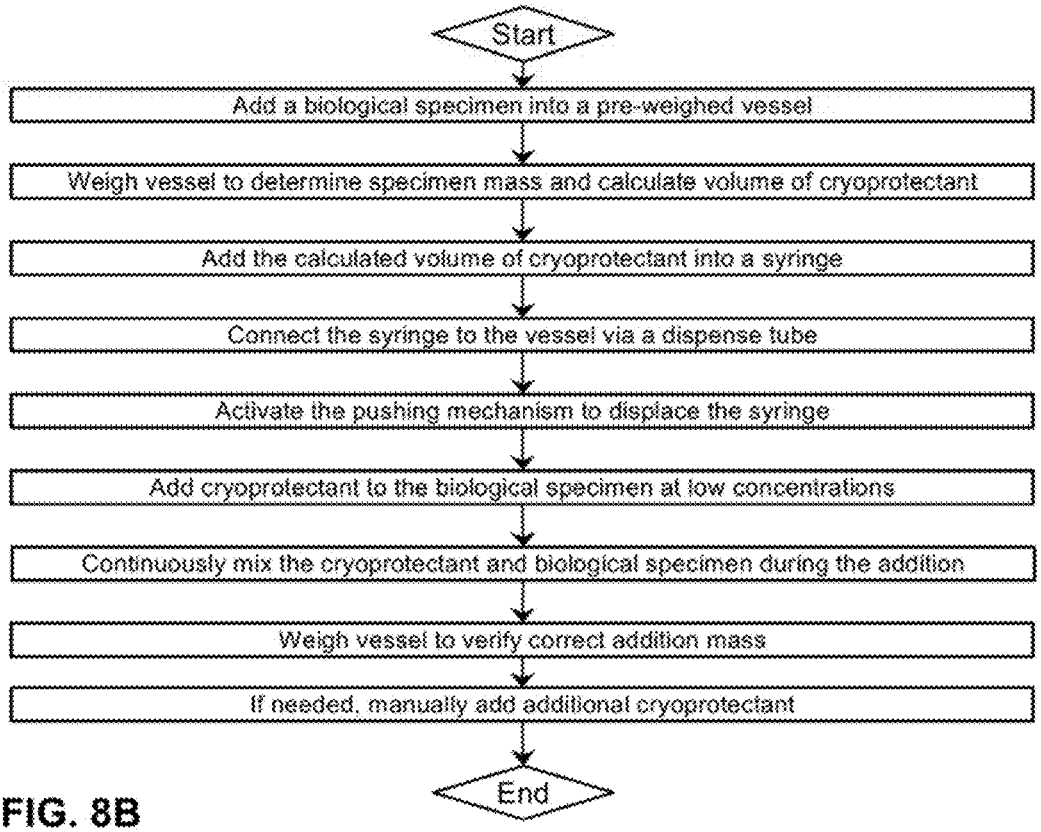
Figure 8C:
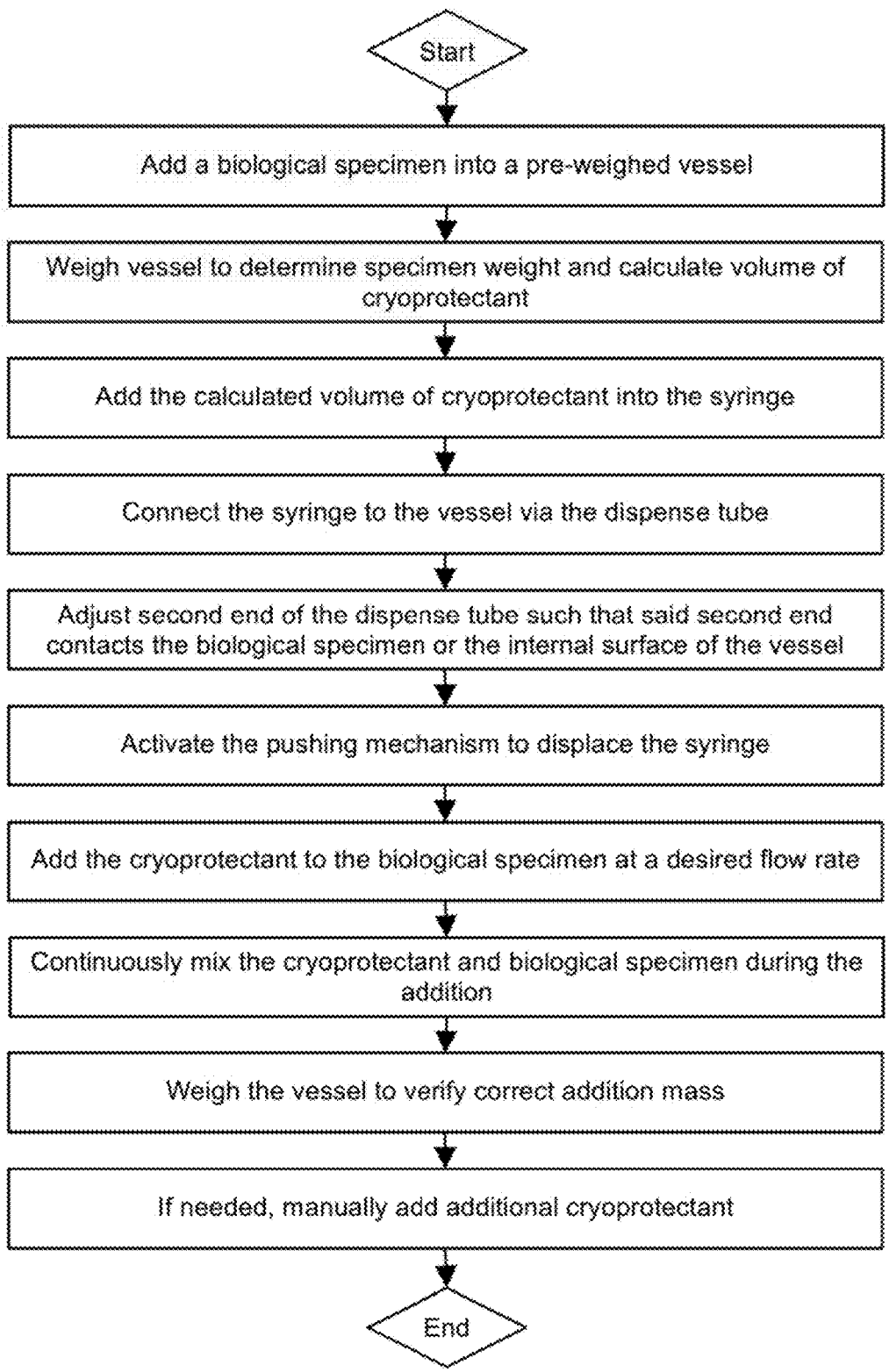

According to some aspects, the systems described herein may be utilized in methods for dispensing a cryoprotectant to a biological specimen as shown in FIGS. 8A-8C. As a key initial step, the volume of cryoprotectant to be added may be determined, based on the amount of the sample, by pre-weighing the vessel, adding the sample, weighing the combined vessel and sample, and subtracting the masses to determine the mass of the sample, and calculating the proper volume of cryoprotectant. In one embodiment as shown in FIG. 8A, the method may comprise providing any one of the cryopreservation systems (100) described herein, fluidly coupling the cryoprotectant (102) to the controlled dispenser (115), adding the biological specimen (104) into the vessel (110), and activating the controlled dispenser (115) to continuously dispense the cryoprotectant (102) through the dispense tube (140) and into the vessel (110). In one embodiment, the controlled dispenser (115) comprises a syringe pump having a syringe and pumping mechanism as previously described herein. Preferably, the pushing mechanism (130) displaces the syringe (120) such that the cryoprotectant (102) is added to the biological specimen (104) continuously and at a desired flow rate. This can prevent droplet formation so that the cryoprotectant (102) is dispensed without being dripped into the vessel (110).

In another embodiment as shown in FIG. 8B, the method may comprise providing any one of the cryopreservation systems (100) described herein, adding a desired volume of cryoprotectant (102) into the syringe (120), adding the biological specimen (104) into the vessel (110), and activating the pushing mechanism (130) to displace the syringe (120). By displacing the syringe, the cryoprotectant (102) is dispensed through the dispense tube (140) and into the vessel (110). Preferably, the pushing mechanism (130) displaces the syringe (120) such that the cryoprotectant (102) is added to the biological specimen (104) at a flow rate that is less than or equal to a maximum flow rate, $f_{max}$, determined by the equation:

$$f_{max} \text{ (ml/min)}=0.0045*V, \text{ where } V=\text{volume of the biological specimen in ml.}$$

Returning to the previous example, the $f_{max}$ for 5 ml of cryoprotectant to be dispensed into the 25 ml semen sample is calculated to be 0.11 ml/min. Thus, the cryoprotectant flow rate should be less than or equal to 0.11 ml/min with a minimum dispense time of about 45 minutes. The previous example flow rate of 0.083 ml/min and dispense time of 60 minutes are within these parameters.

Referring now to FIG. 8C, another embodiment of the method may comprise providing any one of the cryopreservation systems (100) described herein, adding a desired volume of cryoprotectant (102) into the syringe (120), adding the biological specimen (104) into the vessel (110), adjusting the second end (144) of the dispense tube such that said second end (144) is contacting the biological specimen (104) or an internal surface (112) of the vessel, and activating the pushing mechanism (130) to displace the syringe (120). By displacing the syringe, the cryoprotectant (102) is dispensed through the dispense tube (140) and into the vessel (110). Preferably, the pushing mechanism (130) displaces the syringe (120) such that the cryoprotectant (102) is added to the biological specimen (104) at a desired flow rate. More preferably, by contacting the second end (144) of the dispense tube with the internal surface (112) of the vessel or the biological specimen (104), the dispensed cryoprotectant (102) is prevented from being dripped into the vessel (110).

Consistent with the previous embodiments, the methods described herein may further include continuously or intermittently mixing the cryoprotectant (102) and the biological specimen (104) contained in the vessel (110). The cryoprotectant (102) and the biological specimen (104) may be mixed using any of the mixing equipment described herein. In further embodiments, the methods may also comprise adding one or more additional fluids to the vessel via activation of one or more additional controlled dispensers that are fluidly connected to the vessel, each dispenser containing one of the additional fluids. This method may utilize the multiple dispense system as previously described. In some embodiments, the one or more additional fluids may be cryoprotectants or gases. For example, a second fluid may be added to the vessel via activation of a second syringe pump which has a syringe containing the second fluid and is fluidly connected to the vessel.

Consistent with the previous embodiments, the methods described herein may further include weighing the vessel at the end of the addition to verify that the correct mass of cryoprotectant has been added. At this stage, if the mass is determined to be lower than it should be, additional cryoprotectant may be manually or automatically added in order to bring the total amount of cryoprotectant to the calculated amount. If the volume of the secondary, or manual, addition is large in comparison to the total calculated volume, it may be added in multiple sub-volume additions, with waiting time intervals between them. As a non-limiting example, if the volume of manual addition is up to 32% of the total volume the full remaining volume may be delivered in one addition. If the volume of the manual addition is 33-65% of the total volume, it may be divided into two equal quantities which are added with a 15 minute break between the additions. If the volume of the manual addition is equal or greater to 66% of the total volume, it may be divided into three equal quantities which are added with two 15 minute breaks between the additions.

In some aspects, the cryoprotectant may be toxic to the biological specimen, such as sperm cells, in high concentrations. Dispensing the cryoprotectant via bulk or drop-wise addition can deliver immediate high concentrations of the cryoprotectant to the cells that are closest to the entry location of the cryoprotectant prior to being diffused in the cell solution, thus resulting in cytotoxicity to the local cells. In other aspects, drop-wise addition of the cryoprotectant can lead to stress or physical damage due to the droplets striking the cells. Without wishing to limit the present invention to a particular theory or mechanism, the present invention allows for addition of the cryoprotectant in smaller volumes, via slow continuous flow, low-impact entry, and/or a determined flow rate, that reduce the local concentration so as to minimize cytotoxicity and cell stress.

In some embodiments, the dispensing system of the present invention may be used in a cold room or a large cold handling cabinet, so as to preserve sample viability. In an alternative embodiment, the system may be fit inside of a fridge or mini-fridge. Some components of the system, such as the frame, may need to be decreased in size so that the frame, main syringe pumps, and shaker table all fit inside the fridge or mini-fridge. In some embodiments, a secondary frame may be positioned outside of the fridge or mini-fridge (for example, on top of the fridge or mini-fridge) and components such as the computer, power supply, and monitor may be mounted to the secondary frame.

In some embodiments, the pump plunger may be designed so as to also act as a spring-loaded clamping piece that holds the syringes into the pump and block. Certain plungers and clamps may cause inconsistencies of measurement. As a non-limiting example, the sensor to tag distance of the unit may be altered, and may in turn cause the system to incorrectly identify what syringe was loaded into the pump. As such, specialty plungers may be advantageous. Additionally, specialty syringe pump covers may be advantageous so as to provide for safer cable management and easier maintenance removal.

EXAMPLE

The following is a non-limiting example of the present invention. It is to be understood that said example is not intended to limit the present invention in any way. Equivalents or substitutes are within the scope of the present invention.

The cryopreservation system was implemented and compared against a prior cryopreservation procedure. The cryoprotectant was added by the present system at a continuously flow rate, whereas the prior procedure involved three discrete additions spaced 15 minutes apart. The ratio of specimen volume to dispensed cryoprotectant volume was the same in both procedures. The present invention resulted in a 5% recovery of cells, thus the present invention provides, on average, 5% more cells than the prior procedure. Without wishing to limit the present invention to a particular theory or mechanism, the cryopreservation system reduced cell die off through cryopreservation freeze to thaw. Furthermore, the present invention resulted in an 8% increase in insemination dose in straws as compared to the prior procedure.

As used herein, the term "about" refers to plus or minus 10% of the referenced number.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A cryoprotectant dispensing system (100) comprising:
    a) a vessel (110);
    b) a controlled dispenser (115); and
    c) a dispense tube (140) having a first end (142) fluidly connected to a discharge port (126) of the dispenser and a second end (144) disposed inside the vessel (110); and
    d) a controller (136) operatively coupled to the controlled dispenser (115), the controller (136) comprising a processor and a memory operatively coupled to the processor;
    wherein the memory comprises instructions that, when executed by the processor, cause the controller (136) to actuate the controlled dispenser (115) to dispense a cryoprotectant (102) fluid through the dispense tube (140) and into the vessel (110) in a manner or flow rate such that droplet formation is prevented and the cryoprotectant (102) is dispensed without being dripped into the vessel (110), and
    wherein the second end (144) of the dispense tube is contacting an internal surface (112) of the vessel or submerged in a material (104) contained within the vessel so that the dispense cryoprotectant fluid (102) is further prevented from being dripped into the vessel (110).

2. The system of claim 1, wherein the controlled dispenser (115) comprises a syringe pump including a syringe (120) for containing the fluid (102) and a pushing mechanism (130) for displacing said syringe (120), wherein the pushing mechanism (130) comprises a moveable pusher block (132), and a motor (134) operatively coupled to said pusher block (132), wherein the motor controller (136) for controlling the motor (134), wherein the syringe pump is configured to dispense the fluid upon displacement of the syringe (120) by the pushing mechanism (130).

3. The system of claim 2, wherein the pusher block (132) and syringe (120) are arranged on a track (138), wherein the pusher block (132) is aligned with the syringe (120) such that the pusher block (132) can press against a plunger (122) of the syringe, wherein the motor (134) is configured to move the pusher block (132) along the track (138) in a direction that pushes the plunger (122) into a barrel (124) of the syringe, thereby displacing the syringe (120), wherein displacement of the syringe (120) ejects the fluid (102) contained in the barrel (124) through the discharge port (126) and into the dispense tube (140), wherein the fluid (102) exits the dispense tube (140) through the second end (144) and into the vessel (110).

4. The system of claim 1, wherein the controlled dispenser (115) is configured to continuously dispense the fluid into the vessel (110).

5. The system of claim 1, wherein the vessel (110) contains a biological specimen (104).

6. The system of claim 1, further comprising a mixer (150).

7. The system of claim 1, further comprising one or more additional controlled dispensers (115), and a dispense tube (140) fluidly connecting each controlled dispenser (115) to the vessel (110), wherein the one or more additional controlled dispensers (115) are configured to dispense the same or different fluid through the dispense tube (140) and into the vessel (110).

8. A cryopreservation system (100) for dispensing a cryoprotectant (102) to a biological specimen (104), said system (100) comprising:
   a) a vessel (110) for containing the biological specimen (104);
   b) a syringe pump (115) comprising a syringe (120) for containing the cryoprotectant (102), and a pushing mechanism (130) for displacing said syringe (120); wherein the pushing mechanism (130) comprises a moveable pusher block (132), a motor (134) operatively coupled to said pusher block (132), and a motor controller (136) for controlling the motore (134), wherein the motor controller (136) comprises a processor, and a memory operatively coupled to the processor and storing a set of instructions that, when excuted by the processor, causes the motor (134) to move the pusher block (132) at a desired step size in the direction to displace the syringe (120) such that the cryoprotectant (102) is added to the biological specimen (104) at a desired flow rate; and
   c) a dispense tube (140) having a first end (142) fluidly connected to a discharge port (126) of the syringe and a second end (144) disposed inside the vessel (110) such that said second end (144) is contacting an internal surface (112) of the vessel or the biological specimen (104) when it is contained in the vessel (110);
   wherein the syringe pump (115) is configured to dispense the cryoprotectant (102) through the dispense tube (140) and into the vessel (110) upon displacement of the syringe (120) by the pushing mechanism (130), wherein by contacting the second end (144) of the tube with the internal surface (112) of the vessel or the biological specimen (104), droplet formation is prevented and the cryoprotectant (102) is dispensed without being dripped into the vessel (110).

9. The system of claim 8, wherein the second end (144) of the tube is submerged in the biological specimen (104).

10. The system of claim 8, wherein the pusher block (132) and syringe (120) are arranged on a track (138), wherein the pusher block (132) is aligned with the syringe (120) such that the pusher block (132) can press against a plunger (122) of the syringe, wherein the motor (134) is configured to move the pusher block (132) along the track (138) in a direction that pushes the plunger (122) into a barrel (124) of the syringe, thereby displacing the syringe (120),
   wherein displacement of the syringe (120) ejects the cryoprotectant (102) contained in the barrel (124) through the discharge port (126) and into the dispense tube (140), wherein the cryoprotectant (102) exits the dispense tube (140) through the second end (144) and into the vessel (110).

11. The system of claim 8, wherein the pusher block (132) displaces the syringe (120) such that the cryoprotectant (102) is added to the biological specimen (104) at a continuous flow rate.

12. The system of claim 8, wherein the pusher block (132) displaces the syringe (120) such that the cryoprotectant (102) is added to the biological specimen (104) at a pulsed flow rate.

13. The system of claim 8 further comprising a mixer (150) for mixing the cryoprotectant (102) and the biological specimen (104) contained in the vessel (110), wherein the mixer (150) prevents the biological specimen (104) from adhering to the internal surface (112) of the vessel.

14. The system of claim 13, wherein the mixer (150) is a shaker table, wherein the vessel (110) is placed on the shaker table, wherein shaking of the shaker table agitates the cryoprotectant (102) and the biological specimen (104).

15. The system of claim 8 further comprising one or more additional syringe pumps (115), each comprising a syringe (120) containing another fluid and a pushing mechanism (130) for displacing said syringe (120), and a dispense tube (140) fluidly connecting each syringe (120) to the vessel (110), wherein the one or more additional syringe pumps (115) are configured to dispense the other fluid through the dispense tube (140) and into the vessel (110) upon displacement of the syringe (120) by the pushing mechanism (130).

16. The system of claim 15, wherein the other fluid is a gas.

17. A method for dispensing a cryoprotectant (102) to a biological specimen (104), said method comprising:
   a) fluidly coupling the cryoprotectant (102) to a controlled dispenser (115);
   b) adding the biological specimen (104) into a vessel (110);
   c) connecting the controlled dispenser (115) to the vessel (110) via a dispense tube (140), wherein a first end (142) of the dispense tube is fluidly connected to the controlled dispenser (115), and a second end (144) of the dispense tube is disposed inside the vessel (110) such that said second end (144) is contacting the biological specimen (104) or an internal surface (112) of the vessel;and
   d) dispensing the cryoprotectant (102) into the vessel (110) at a desired flow rate via the controlled dispenser (115), thereby adding the cryoprotectant (102) to the biological specimen (104);
   wherein by contacting the second end (144) of the dispense tube with the internal surface (112) of the vessel or the biological specimen (104), droplet formation is prevented and the cryoprotectant (102) is dispensed without being dripped into the vessel (110).

* * * * *

UNITED STATES PATENT AND TRADEMARK OFFICE
CERTIFICATE OF CORRECTION

| | | |
|---|---|---|
| PATENT NO. | : 11,889,830 B2 | Page 1 of 1 |
| APPLICATION NO. | : 16/852303 | |
| DATED | : February 6, 2024 | |
| INVENTOR(S) | : Domenic Busa et al. | |

It is certified that error appears in the above-identified patent and that said Letters Patent is hereby corrected as shown below:

In the Claims

In Column 14, Line 54, in Claim 1, delete "cryoprotectant (102) fluid" and insert -- cryoprotectant fluid (102) --.

In Column 14, Line 56-57, in Claim 1, delete "cryoprotectant (102)" and insert -- cryoprotectant fluid (102) --.

Signed and Sealed this
Fourteenth Day of January, 2025

Derrick Brent
*Acting Director of the United States Patent and Trademark Office*